(12) United States Patent
Okumoto et al.

(10) Patent No.: US 7,673,107 B2
(45) Date of Patent: *Mar. 2, 2010

(54) STORAGE SYSTEM AND STORAGE CONTROL DEVICE

(75) Inventors: Katsuhiro Okumoto, Odawara (JP); Yoshihito Nakagawa, Ooi (JP); Hisao Honma, Odawara (JP); Keishi Tamura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/773,081

(22) Filed: Jul. 3, 2007

(65) Prior Publication Data

US 2008/0016303 A1    Jan. 17, 2008

Related U.S. Application Data

(63) Continuation of application No. 11/016,806, filed on Dec. 21, 2004.

(30) Foreign Application Priority Data

Oct. 27, 2004    (JP) ............................. 2004-312358

(51) Int. Cl.
*G06F 12/00* (2006.01)
*G06F 21/00* (2006.01)
*G06F 13/00* (2006.01)
*G06F 9/26* (2006.01)
*G06F 9/34* (2006.01)
*G06F 17/30* (2006.01)
*G06F 15/16* (2006.01)

(52) U.S. Cl. .................. 711/162; 711/165; 711/170; 711/202; 707/204; 709/213

(58) Field of Classification Search .................. None
See application file for complete search history.

(56) References Cited

U.S. PATENT DOCUMENTS 3,771,137 A    11/1973    Barner et al.

(Continued)

FOREIGN PATENT DOCUMENTS

EP    0902370    3/1999

(Continued)

OTHER PUBLICATIONS

IBM DB2 DataPropagator for z/os, Version 8.1, IBM DB2 Guide, 2002, 4 pages.

(Continued)

*Primary Examiner*—Sheng-Jen Tsai
*Assistant Examiner*—Michael Alsip
(74) *Attorney, Agent, or Firm*—Antonelli, Terry, Stout & Kraus, LLP.

(57) ABSTRACT

A virtualization system, including: at least one first port coupled to at least one host system; at least one second port coupled to a plurality of storage systems; wherein the virtualization system is capable to control to perform processes of splitting a relationship between the first virtual volume and the second virtual volume; storing first differential information identifying data of a first write request; write data of first write request to a storage area of the disk drives related to the first logical volume; storing second differential information identifying data of a second write request, the data of the second request being written after the splitting step, receiving a differential copying request; to copy differential data from the first virtual volume to the second virtual volume, or to copy differential data from the second virtual volume to the first virtual volume.

15 Claims, 18 Drawing Sheets

U.S. PATENT DOCUMENTS

| | | | |
|---|---|---|---|
| 4,025,904 A | 5/1977 | Adney et al. | |
| 4,710,868 A | 12/1987 | Cocke et al. | |
| 5,155,845 A | 10/1992 | Beal et al. | |
| 5,170,480 A | 12/1992 | Mohan et al. | |
| 5,307,481 A | 4/1994 | Shimazaki et al. | |
| 5,379,418 A | 1/1995 | Shimazaki et al. | |
| 5,408,465 A | 4/1995 | Gusella et al. | |
| 5,459,857 A | 10/1995 | Ludlam et al. | |
| 5,504,882 A | 4/1996 | Chai et al. | |
| 5,544,347 A | 8/1996 | Yanai et al. | |
| 5,548,712 A | 8/1996 | Larson et al. | |
| 5,555,371 A | 9/1996 | Duyanovich et al. | |
| 5,574,950 A | 11/1996 | Hathorn et al. | |
| 5,680,580 A | 10/1997 | Beardsley et al. | |
| 5,680,640 A | 10/1997 | Ofek et al. | |
| 5,720,029 A | 2/1998 | Kern et al. | |
| 5,734,818 A | 3/1998 | Kern et al. | |
| 5,742,792 A | 4/1998 | Yanai et al. | |
| 5,758,118 A | 5/1998 | Choy et al. | |
| 5,799,323 A | 8/1998 | Mosher et al. | |
| 5,809,285 A | 9/1998 | Hilland | |
| 5,835,953 A | 11/1998 | Ohran | |
| 5,835,954 A | 11/1998 | Duyanovich et al. | |
| 5,870,537 A | 2/1999 | Kern et al. | |
| 5,895,485 A | 4/1999 | Loechel et al. | |
| 5,901,327 A | 5/1999 | Ofek | |
| 5,917,723 A | 6/1999 | Binford | |
| 5,933,653 A | 8/1999 | Ofek | |
| 5,956,750 A | 9/1999 | Yamamoto et al. | |
| 5,974,563 A | 10/1999 | Beeler | |
| 5,978,890 A | 11/1999 | Ozawa et al. | |
| 5,995,980 A | 11/1999 | Olson et al. | |
| 6,012,123 A | 1/2000 | Pecone et al. | |
| 6,044,444 A | 3/2000 | Ofek | |
| 6,052,758 A | 4/2000 | Crockett et al. | |
| 6,092,066 A | 7/2000 | Ofek | |
| 6,098,129 A | 8/2000 | Fukuzawa et al. | |
| 6,101,497 A | 8/2000 | Ofek | |
| 6,108,748 A | 8/2000 | Ofek et al. | |
| 6,148,383 A | 11/2000 | Micka et al. | |
| 6,157,991 A | 12/2000 | Arnon | |
| 6,173,374 B1 | 1/2001 | Heil et al. | |
| 6,173,377 B1 | 1/2001 | Yanai et al. | |
| 6,178,427 B1 | 1/2001 | Parker | |
| 6,195,730 B1 | 2/2001 | West | |
| 6,209,002 B1 | 3/2001 | Gagne et al. | |
| 6,219,753 B1 | 4/2001 | Richardson | |
| 6,230,239 B1 | 5/2001 | Sakaki et al. | |
| 6,237,008 B1 | 5/2001 | Beal et al. | |
| 6,240,486 B1 | 5/2001 | Ofek et al. | |
| 6,240,494 B1 | 5/2001 | Nagasawa et al. | |
| 6,247,099 B1 | 6/2001 | Skazinski et al. | |
| 6,247,103 B1 | 6/2001 | Kern et al. | |
| 6,253,295 B1 * | 6/2001 | Beal et al. | 711/162 |
| RE37,305 E | 7/2001 | Chang et al. | |
| 6,282,610 B1 | 8/2001 | Bergsten | |
| 6,308,283 B1 | 10/2001 | Galipeau | |
| 6,324,654 B1 | 11/2001 | Wahl et al. | |
| 8,341,329 | 1/2002 | LeCrone at al. | |
| 6,356,977 B2 | 3/2002 | Ofek et al. | |
| 6,360,306 B1 | 3/2002 | Bergsten | |
| 6,363,462 B1 | 3/2002 | Bergsten | |
| 6,393,538 B2 | 5/2002 | Murayama | |
| 6,397,307 B2 | 5/2002 | Ohran | |
| 6,408,370 B2 | 6/2002 | Yamamoto et al. | |
| 6,442,706 B1 | 8/2002 | Wahl et al. | |
| 6,446,141 B1 | 9/2002 | Nolan et al. | |
| 6,446,175 B1 | 9/2002 | West et al. | |
| 6,446,176 B1 | 9/2002 | West et al. | |
| 6,453,354 B1 | 9/2002 | Jiang et al. | |
| 6,457,109 B1 * | 9/2002 | Milillo et al. | 711/162 |
| 6,457,139 B1 | 9/2002 | D'Errico et al. | |
| 6,460,055 B1 | 10/2002 | Midgley et al. | |
| 6,463,501 B1 | 10/2002 | Kern et al. | |
| 6,467,034 B1 | 10/2002 | Yanaka | |
| 6,477,627 B1 | 11/2002 | Ofek | |
| 6,480,934 B1 | 11/2002 | Hino et al. | |
| 6,484,173 B1 | 11/2002 | O'Hare et al. | |
| 6,487,645 B1 | 11/2002 | Clark et al. | |
| 6,490,659 B1 | 12/2002 | McKean et al. | |
| 6,496,908 B1 | 12/2002 | Kamvysselis et al. | |
| 6,523,096 B2 | 2/2003 | Sanada et al. | |
| 6,526,487 B2 | 2/2003 | Ohran et al. | |
| 6,529,976 B1 | 3/2003 | Fukuzawa et al. | |
| 6,553,408 B1 | 4/2003 | Merrell et al. | |
| 6,560,673 B2 | 5/2003 | Elliott | |
| 6,587,935 B2 | 7/2003 | Ofek | |
| 6,598,134 B2 | 7/2003 | Ofek et al. | |
| 6,622,152 B1 | 9/2003 | Sinn et al. | |
| 6,622,220 B2 | 9/2003 | Yoshida et al. | |
| 6,625,623 B1 | 9/2003 | Midgley et al. | |
| 6,640,278 B1 | 10/2003 | Nolan et al. | |
| 6,640,291 B2 | 10/2003 | Fujibayashi | |
| 6,643,671 B2 * | 11/2003 | Milillo et al. | 707/204 |
| 6,647,387 B1 | 11/2003 | McKean et al. | |
| 6,647,414 B1 | 11/2003 | Eriksson et al. | |
| 6,647,474 B2 | 11/2003 | Yanai et al. | |
| 6,647,476 B2 | 11/2003 | Nagasawa et al. | |
| 6,654,830 B1 | 11/2003 | Taylor et al. | |
| 6,654,831 B1 | 11/2003 | Otterness et al. | |
| 6,662,197 B1 | 12/2003 | LeCrone et al. | |
| 6,675,258 B1 | 1/2004 | Bramhall et al. | |
| 6,681,303 B1 | 1/2004 | Watabe et al. | |
| 6,681,339 B2 | 1/2004 | McKean et al. | |
| 6,684,310 B2 | 1/2004 | Anzai et al. | |
| 6,697,367 B1 | 2/2004 | Halstead et al. | |
| 6,708,232 B2 | 3/2004 | Obara | |
| 6,718,404 B2 | 4/2004 | Reuter et al. | |
| 6,745,281 B1 | 6/2004 | Saegusa | |
| 6,772,315 B1 | 8/2004 | Perego | |
| 6,799,255 B1 | 9/2004 | Blumenau et al. | |
| 6,804,676 B1 | 10/2004 | Bains | |
| 6,816,948 B2 | 11/2004 | Kitamura et al. | |
| 6,826,778 B2 | 11/2004 | Bopardikar et al. | |
| 6,851,020 B2 | 2/2005 | Matsumoto et al. | |
| 6,857,057 B2 | 2/2005 | Nelson et al. | |
| 6,876,656 B2 | 4/2005 | Brewer et al. | |
| 6,883,064 B2 | 4/2005 | Yoshida et al. | |
| 6,883,122 B2 | 4/2005 | Maple et al. | |
| 6,922,761 B2 | 7/2005 | O'Connell et al. | |
| 6,941,322 B2 | 9/2005 | Bills et al. | |
| 6,959,369 B1 | 10/2005 | Ashton et al. | |
| 6,968,349 B2 | 11/2005 | Owen et al. | |
| 6,973,549 B1 | 12/2005 | Testardi | |
| 6,976,103 B1 | 12/2005 | Watanabe et al. | |
| 6,976,134 B1 | 12/2005 | Lolayekar et al. | |
| 7,143,262 B2 * | 11/2006 | Serizawa | 711/171 |
| 7,373,472 B2 * | 5/2008 | Bhasin et al. | 711/170 |
| 2001/0029570 A1 | 10/2001 | Yamamoto et al. | |
| 2001/0050915 A1 | 12/2001 | O'Hare et al. | |
| 2001/0052018 A1 | 12/2001 | Yokokura | |
| 2001/0054133 A1 | 12/2001 | Murotani et al. | |
| 2002/0003022 A1 | 1/2002 | Csida et al. | |
| 2002/0004857 A1 | 1/2002 | Arakawa et al. | |
| 2002/0004890 A1 | 1/2002 | Ofek et al. | |
| 2002/0019908 A1 | 2/2002 | Reuter et al. | |
| 2002/0019920 A1 | 2/2002 | Reuter et al. | |
| 2002/0019922 A1 | 2/2002 | Reuter et al. | |
| 2002/0019923 A1 | 2/2002 | Reuter et al. | |
| 2002/0026558 A1 | 2/2002 | Reuter et al. | |
| 2002/0029326 A1 | 3/2002 | Reuter et al. | |
| 2002/0065864 A1 | 5/2002 | Hartsell et al. | |
| 2002/0087544 A1 | 7/2002 | Selkirk et al. | |
| 2002/0087751 A1 | 7/2002 | Chong | |

| | | |
|---|---|---|
| 2002/0103889 A1 | 8/2002 | Markson et al. |
| 2002/0112113 A1 | 8/2002 | Karpoff et al. |
| 2002/0124108 A1 | 9/2002 | Terrell et al. |
| 2002/0133511 A1 | 9/2002 | Hostetter et al. |
| 2002/0133735 A1 | 9/2002 | McKean et al. |
| 2002/0143888 A1 | 10/2002 | Lisiecki et al. |
| 2002/0156887 A1 | 10/2002 | Hashimoto |
| 2002/0156984 A1 | 10/2002 | Padovano |
| 2002/0156987 A1 | 10/2002 | Gajjar et al. |
| 2002/0178328 A1 | 11/2002 | Honda et al. |
| 2002/0178335 A1 | 11/2002 | Selkirk et al. |
| 2002/0184463 A1 * | 12/2002 | Arakawa et al. ............ 711/170 |
| 2002/0188592 A1 | 12/2002 | Leonhardt et al. |
| 2002/0194428 A1 | 12/2002 | Green |
| 2002/0194523 A1 | 12/2002 | Ulrich et al. |
| 2003/0014432 A1 | 1/2003 | Teloh et al. |
| 2003/0014433 A1 | 1/2003 | Teloh et al. |
| 2003/0037071 A1 | 2/2003 | Harris et al. |
| 2003/0051109 A1 | 3/2003 | Cochran |
| 2003/0051111 A1 | 3/2003 | Nakano et al. |
| 2003/0056038 A1 | 3/2003 | Cochran |
| 2003/0074378 A1 | 4/2003 | Midgley et al. |
| 2003/0074600 A1 | 4/2003 | Tamatsu et al. |
| 2003/0079018 A1 | 4/2003 | Lolayekar et al. |
| 2003/0079019 A1 | 4/2003 | Lolayekar et al. |
| 2003/0084075 A1 | 5/2003 | Balogh et al. |
| 2003/0093541 A1 | 5/2003 | Lolayekar et al. |
| 2003/0093567 A1 | 5/2003 | Lolayekar et al. |
| 2003/0097607 A1 | 5/2003 | Bessire |
| 2003/0101228 A1 | 5/2003 | Busser et al. |
| 2003/0105931 A1 | 6/2003 | Weber et al. |
| 2003/0115218 A1 | 6/2003 | Bobbitt et al. |
| 2003/0115432 A1 | 6/2003 | Biessener et al. |
| 2003/0126327 A1 | 7/2003 | Pesola et al. |
| 2003/0126388 A1 | 7/2003 | Yamagami |
| 2003/0145168 A1 | 7/2003 | LeCrone et al. |
| 2003/0145169 A1 | 7/2003 | Nagasawa et al. |
| 2003/0158999 A1 | 8/2003 | Hauck et al. |
| 2003/0163553 A1 | 8/2003 | Kitamura et al. |
| 2003/0167419 A1 | 9/2003 | Yanai et al. |
| 2003/0172069 A1 | 9/2003 | Uchiyama et al. |
| 2003/0182525 A1 | 9/2003 | O'Connell et al. |
| 2003/0189936 A1 | 10/2003 | Terrell et al. |
| 2003/0200387 A1 | 10/2003 | Urabe et al. |
| 2003/0204479 A1 | 10/2003 | Bills et al. |
| 2003/0204597 A1 | 10/2003 | Arakawa et al. |
| 2003/0204700 A1 | 10/2003 | Biessener et al. |
| 2003/0212854 A1 | 11/2003 | Kitamura et al. |
| 2003/0212860 A1 | 11/2003 | Jiang et al. |
| 2003/0217031 A1 | 11/2003 | Owen et al. |
| 2003/0220935 A1 | 11/2003 | Vivian et al. |
| 2003/0221077 A1 | 11/2003 | Ohno et al. |
| 2003/0229645 A1 | 12/2003 | Mogi et al. |
| 2003/0229764 A1 | 12/2003 | Ohno et al. |
| 2004/0003022 A1 | 1/2004 | Garrison et al. |
| 2004/0028043 A1 | 2/2004 | Maveli et al. |
| 2004/0030703 A1 | 2/2004 | Bourbonnais et al. |
| 2004/0049553 A1 | 3/2004 | Iwamura et al. |
| 2004/0054850 A1 | 3/2004 | Fisk |
| 2004/0054866 A1 | 3/2004 | Blumenau et al. |
| 2004/0059738 A1 | 3/2004 | Tarbell |
| 2004/0064610 A1 | 4/2004 | Fukuzawa et al. |
| 2004/0064641 A1 | 4/2004 | Kodama |
| 2004/0068637 A1 | 4/2004 | Nelson et al. |
| 2004/0073831 A1 | 4/2004 | Yanai et al. |
| 2004/0098547 A1 | 5/2004 | Ofek et al. |
| 2004/0103261 A1 * | 5/2004 | Honda et al. ............ 711/202 |
| 2004/0111485 A1 | 6/2004 | Mimatsu et al. |
| 2004/0123180 A1 | 6/2004 | Soejima et al. |
| 2004/0139237 A1 | 7/2004 | Rangan et al. |
| 2004/0143832 A1 | 7/2004 | Yamamoto et al. |
| 2004/0148443 A1 | 7/2004 | Achiwa et al. |
| 2004/0158652 A1 | 8/2004 | Obara |
| 2004/0158673 A1 | 8/2004 | Matsunami et al. |
| 2004/0172510 A1 | 9/2004 | Nagashima et al. |
| 2004/0230980 A1 | 11/2004 | Koyama et al. |
| 2004/0250021 A1 * | 12/2004 | Honda et al. ............ 711/114 |
| 2004/0260875 A1 | 12/2004 | Murotani et al. |
| 2004/0260966 A1 | 12/2004 | Kaiya et al. |
| 2005/0010734 A1 | 1/2005 | Soejima et al. |
| 2005/0010743 A1 | 1/2005 | Tremblay et al. |
| 2005/0033878 A1 | 2/2005 | Pangal et al. |
| 2005/0038968 A1 | 2/2005 | Iwamura et al. |
| 2005/0050115 A1 | 3/2005 | Kekre |
| 2005/0055501 A1 | 3/2005 | Guha et al. |
| 2005/0081009 A1 | 4/2005 | Williams et al. |
| 2005/0138184 A1 | 6/2005 | Amir et al. |
| 2006/0090048 A1 * | 4/2006 | Okumoto et al. ............ 711/162 |

FOREIGN PATENT DOCUMENTS

| | | |
|---|---|---|
| EP | 938046 | 8/1999 |
| EP | 938046 A1 * | 8/1999 |
| EP | 1 130 514 | 9/2001 |
| EP | 1357476 | 10/2003 |
| EP | 1357476 A2 * | 10/2003 |
| JP | 62-274448 | 11/1987 |
| JP | 02-037418 | 2/1990 |
| JP | 07-191811 | 7/1995 |
| JP | 7-244597 | 9/1995 |
| JP | 09-288547 | 11/1997 |
| JP | 10-508967 | 9/1998 |
| JP | 10-283272 | 10/1998 |
| JP | 11-065980 | 3/1999 |
| JP | 2000-163329 | 6/2000 |
| JP | 2000-242434 | 9/2000 |
| JP | 2000-293317 | 10/2000 |
| JP | 2001-067187 | 3/2001 |
| JP | 2001-249853 | 9/2001 |
| JP | 2001-331355 | 11/2001 |
| JP | 2001-337850 | 12/2001 |
| JP | 2002-157091 | 5/2002 |
| JP | 2002-230246 | 8/2002 |
| WO | WO 97/09676 | 3/1997 |
| WO | WO 03/023640 | 3/2003 |
| WO | 03027886 | 4/2003 |
| WO | 03030431 | 4/2003 |
| WO | 03030449 | 4/2003 |

OTHER PUBLICATIONS

Lyon, "Tandem's Remote Data Facility", Proc. IEEE Spring CompCon Conf., pp. 562-567 (1990).

"Celerra Data Migration Service (CDMS)", White Paper, EMC Corporation Hopkinton, MA (Jan. 2002).

"Data Migration Solution Transferring Data Between Storage Systems over Fibre-channel or SCSI Connections", SANRAD Application Note: APP-003-03, SANRAD Inc. San Mateo, CA (2003).

"Migrating Individual Servers to an iSCSI SAN", SANRAD Application Note: APP-004-0 1, SANRAD inc. San Mateo, CA (2003).

"Network Attached Storage in the Data Protection Environment", Sony Electronics Inc. (Feb. 2002).

Anderson, et al., "Hippodrome: Running Circles Around Storage Administration", Proceedings of the 1st USENIX Conference on File and Storage Technologies (Jan. 2002).

Meggyesi, "Fibre Channel Overview", High Speed Interconnect project European Laboratory of Particle Physics (CERN) web page http://hsi.web.cern.ch (Aug. 1994).

Sarkar, et al., "Internet Protocol storage area network", IBM Systems Journal 42: 218-231(2003).

Sicolo "SCSI-3 Fault Tolerant Controller Configurations Utilizing SCC & New Event Codes", T10 Committee of the International Committee on Information Technology Standards (INCITS), X3T10 95 (Oct. 1995).

"Replication Guide and Reference V7: Document No. SC26-9920-00", IBM DB2 Guide, 2000 455 pages.

"Replication Guide and Reference V8: Document No. SC27-1121-01", IBM DB2 Guide, 2003, 789 pgs.

"IBM DB2 RepliData for z/os, Version 3.1", IBM DB2 Guide, Mar. 2003, 2 pages.

Crossroads Systems, et al., "The case for storage virtualization using intelligent routers", Jan. 1, 2001, White Paper, pp. 1-12.

* cited by examiner

| VDEV | EXTERNAL DEVICE INFORMATION ||||||
| | DEVICE DISCRIMINATING INFORMATION | CAPACITY (KB) | DEVICE TYPE | PATH INFORMATION ||
| | | | | WWN | LUN |
|---|---|---|---|---|---|
| 0 | DRFGTFNEIEK | 657,456 | DISK | 0xAABBCCDD | 0 |
| 1 | ADRFGTFNEIE | 89,854 | DISK | 0xAABBEEFF | 3 |
| 2 | GGRRFFDDERT | — | TAPE | 0x445566AAB | 5 |
| 3 | AABBCCDDEE | 5,544223 | DISK | 0x77DE12345 | 6 |
| | | | | 0x77DE12345 | 3 |
| | | | | 0x377DE7890 | 5 |

} SUBSTITUTE PATH

FIG. 8

| COPYING PAIR CONTROL TABLE | | | T6 |
|---|---|---|
| COPYING SOURCE LU | COPYING DESTINATION LU | PAIR STATE |
| LU#1 | LU#11 | PAIR FORMED |
| LU#2 | LU#12 | PAIR SPLIT |
| ... | ... | ... |

FIG. 9

ACCESS ATTRIBUTE CONTROL TABLE (T7)

| LU NUMBER | ACCESS ATTRIBUTE |
|---|---|
| LU#1 | READ/WRITE POSSIBLE |
| LU#2 | READ ONLY (WRITE PROHIBITED) |
| LU#3 | READ/WRITE IMPOSSIBLE |
| LU#4 | EMPTY CAPACITY 0 |
| LU#5 | COPYING DESTINATION SETTING IMPOSSIBLE |
| LU#6 | HIDDEN |
| ... | ... |

STORAGE SYSTEM AND STORAGE CONTROL DEVICE

CROSS-REFERENCE TO RELATED APPLICATION

This is a continuation of U.S. application Ser. No. 11/016,806, filed Dec. 21, 2004, which relates to U.S. application Ser. No. 11/697,777, filed Apr. 9, 2007. This application relates to and claims priority from Japanese Patent Application No. 2004-312358, filed on Oct. 27, 2004. The entirety of the contents and subject matter of all of the above is incorporated herein by reference.

BACKGROUND OF THE INVENTION

1. Field of the Invention

The present invention relates to a storage system and a storage control device.

2. Description of the Related Art

For example, data is controlled using relatively large-scale storage systems in order to handle large quantities of various types of data in government organizations, public offices, autonomous regional bodies, business enterprises, educational organizations and the like. For instance, such storage systems are constructed from disk array devices or the like. Disk array devices are constructed by disposing numerous storage devices in the form of an array; for example, a storage region based on an RAID (redundant array of independent disks) is provided. One or more logical volumes (logical units) are formed in a physical storage region provided by a storage device group, and these logical volumes are provided to a host computer (more specifically, to a data base program operating in a host computer). The host computer (hereafter abbreviated to "host") can perform the reading and writing of data with respect to the logical volumes by transmitting specified commands.

With the development of an informationized society and the like, there has been a continual increase in the amount of data that must be managed. Consequently, there is a demand for storage control devices that offer higher performance and a larger capacity, and new types of storage control devices have been developed one after another in order to meet this market demand. There are two conceivable methods for introducing new types of storage control devices as storage systems. One is a method in which an old type of storage control device and a new type of storage control device are completely interchanged, so that a storage system is constructed from a completely new type of storage control device (Japanese Patent Publication No. 10-508967). The other method is a method in which a new type of storage control device is added to a storage system consisting of an old type of storage device, so that new and old types of storage devices are caused to coexist.

Furthermore, a technique in which the storage region of a physical device is controlled in sector units, and a logical device is dynamically constructed in sector units, is also known (Japanese Patent Application Laid-Open No. 2001-337850).

Moreover, a technique is also known which is devised so that when a logical device is constructed from a plurality of storage devices with different capacities, an area is formed in accordance with the storage device that has the smallest capacity, and an area is formed in accordance with the smallest capacity in the case of the remaining capacity as well (Japanese Patent Application Laid-Open No. 9-288547).

In cases where a complete transition is made from an old type of storage control device to a new type of storage control device, the function and performance of the new type of storage control device can be utilized; however, the old type of storage control device cannot be effectively utilized, and the introduction costs are also increased. On the other hand, in cases where an old type of storage control device and a new type of storage control device are used together, the number of storage control devices that construct the storage system is increased, and considerable effort is required in order to control and operate both the new and old storage control devices.

Furthermore, in cases where the response of the storage device in which the old type of storage control device is installed is slow, the performance of the overall system drops as a result of this old type of storage control device being connected to the storage system. For example, such cases include cases in which the old type of storage device is a device that involves mechanical operations (such as head seeking or the like), so that the mechanical operating time is long, cases in which the capacity of the data transfer buffer of the old type of storage device is small, and the like.

Furthermore, there may also be cases in which an old type of storage device cannot be utilized "as is", as in combinations of open type storage devices and main frames, or servers to which only storage devices with specified functions can be connected.

SUMMARY OF THE INVENTION

The present invention was devised in light of the above problems. One object of the present invention is to provide a storage system and storage control device which are devised so that different types of storage control devices such as new and old storage control devices can be caused to cooperate, thus allowing effective utilization of memory resources. Another object of the present invention is provide a storage system and storage control device which allow the utilization of an old type of storage control device as a new type of storage control device. Another object of the present invention is to provide a storage system and storage control device which are devised so that new functions can be added while utilizing the advantages of an old type of storage device. Another object of the present invention is to provide a storage system and storage control device which are devised so that the memory resources of a second storage control device can be incorporated into a first storage control device as a first virtual volume, and the storage contents of the first real volume of the first storage control device and this first virtual volume can be synchronized. Other objects of the present invention will become clear from the following description of embodiments.

In order to solve the abovementioned problems, the storage system of the present invention is a storage system which is constructed by communicably connecting a first storage control device and a second storage control device, and which performs data processing in accordance with requests from a higher device, wherein the abovementioned first storage control device comprises a first real volume, a first virtual volume that can form a copying pair with the first real volume, a first control part that respectively controls data communications between the first real volume and first virtual volume, and the higher device and second storage control device, and a synchronizing part that synchronizes the storage contents of the first real volume and the storage contents of the first virtual volume, and the second storage control device comprises a second real volume that is associated with the first virtual volume, and a second control part that respectively controls data communications between the second real volume, and the higher device and first storage control device.

For example, storage devices such as disk array devices or the like, or highly functionalized switches (fiber channel switches or the like) can be used as the storage control devices. The first storage control device respectively comprises a first real volume and a first virtual volume. The first real volume is constructed on the basis of first storage device which has a first storage control device, and the first virtual volume is constructed on the basis of a second storage device which has a second storage control device.

Specifically, the first storage control part incorporates the memory resources of the second storage control device as though these memory resources were its own memory resources, and provides these memory resources to the higher device. Furthermore, the synchronizing part synchronizes the storage contents of the first real volume and first virtual volume. Accordingly, a backup of the first real volume can be formed in the first virtual volume, and conversely, a backup of the first virtual volume can be formed in the first real volume. Here, the synchronization modes can be divided into two main types: namely, a full copying mode in which all of the storage contents are copied, and a differential copying mode in which only the differential data is copied.

In an embodiment of the present invention, the first storage control device has a first storage device, and the second storage control device has a second storage device; furthermore, the first real volume is connected to the first storage device via an intermediate storage device, and the first virtual volume is connected to the second storage device via a virtually constructed virtual intermediate storage device. Here, the intermediate storage device is a storage hierarchy which logically connects the first storage device that provides a physical storage region, and the first virtual volume. Similarly, the virtual intermediate storage device is a storage hierarchy which logically connects the second storage device that provides a physical storage region, and the first virtual volume. Furthermore, while the intermediate storage device is set in the storage region of the of the first storage device of the first storage control device, the virtual intermediate storage device is associated with the storage region of the second storage device of the second storage control device. Specifically, by mapping the second storage device in the virtual intermediate storage device, it is possible to vary the storage capacity, or to employ a stripe structure or the like.

The synchronizing part can copy the entire storage contents stored in the first real volume into the first virtual volume. Conversely, the synchronizing part can also copy the entire storage contents stored in the first virtual volume into the first real volume.

Alternatively, the synchronizing part can also copy the differential data between the storage contents of the first real volume and the storage contents of the first virtual volume into the first virtual volume. For example, after the first real volume and first virtual volume are synchronized by full copying, the copying pair consisting of the two volumes is temporarily released (split). Then, in cases where a change occurs in the storage contents of the first virtual volume as a result of a write request from the higher device, the storage contents of the two volumes can again be caused to coincide by separately controlling the this changed differential data, and copying only this differential data into the first real volume.

Here, in cases where write requests to the first real volume from the higher device are stopped, the synchronizing part can copy the differential data into the first virtual volume. As a result, the storage contents of both volumes can be matched.

In an embodiment of the present invention, the system further comprises a managing device which is communicably connected to the first storage control device and second storage control device, respectively. Furthermore, in cases where the access attribute of "write prohibited" is set in the first real volume by the managing device, the synchronizing part copies the differential data into the first virtual volume, and when the copying of the differential data is completed, the managing device can set the access attribute of the first real volume as "read and write possible".

The function of the managing device can be constructed from a computer program. Accordingly, for example, the managing device can be constructed as a computer device that is separate from the higher device, or can be installed inside the higher device. The term "access attribute" refers to information that is used to control whether or not a given volume can be accessed. Examples of access attributes include "write prohibited (read only)" which prohibits the updating of data, "read/write possible" which allows both the reading and writing of data, "hidden" which does not respond to inquiry responses, "empty capacity 0" which responds that the state is full in the case of inquiries for empty capacity, and the like.

By starting differential copying after setting the access attribute of the volume as "write prohibited", it is possible to prohibit updating requests (write requests) from the higher device, and to match the storage contents of the copying source volume (the first real volume in this case) and the copying destination volume (the first virtual volume in this case). Furthermore, since it is sufficient to alter only the access attribute inside the storage control device without any need to alter the setting of the higher device, data matching can be ensured by means of comparatively simple construction.

The synchronizing part can also copy differential data between the storage contents of the first real volume and the storage contents of the first virtual volume into the first real volume. Furthermore, in this case, the synchronizing part can acquire differential control information relating to the differential data from the second storage control device, and can read out differential data from the second storage control device and copy this data into the first real volume on the basis of this differential control information.

Furthermore, in cases where write requests to the second real volume from the higher device are prohibited, the synchronizing part can maintain the matching of data by copying the differential data into the first real volume.

Moreover, in cases where a managing device that is communicably connected to the first storage control device and second storage control device, respectively is provided, and the access attribute of "write prohibited" is set in the second real volume by the managing device, the synchronizing part can copy the differential data into the first real volume, and when the copying of this differential data has been completed, the managing device can also set the access attribute of the second real volume as "read and write possible".

In an embodiment of the present invention, the storage system is a storage system in which a first storage control device and a second storage control device are communicably connected, this storage system comprising a higher device that can respectively issue access requests to the first storage control device and second storage control device, and a managing device that can communicate with the first storage control device and second storage control device, wherein the first storage control device comprises a first storage device that stores data, an intermediate storage device that is disposed in the storage region of this first storage device, a first real volume that is disposed in the storage region of this intermediate storage device, a virtual intermediate storage device that is disposed in the storage region of the second storage device of the second storage control device, a first virtual volume that is disposed in the storage region of this virtual intermediate storage device, a higher communications control part that respectively controls data communications between the higher device, and the second storage control device and managing device, a lower communications control part that controls data communications with the first storage device, a memory part that is shared by the higher communications control part and lower communications control part, and a mapping table that is stored in the memory part and that is used to map the second storage device in the virtual intermediate storage device. Furthermore, in cases where the first full copying mode that copies all of the storage contents stored in the first virtual volume into the first real volume is designated by the managing device, the higher communications control part refers to the mapping table and reads out all of the data from the second real volume, and the lower communications control part stores all of this read-out data in the first storage device. On the other hand, in cases where the second full copying mode that copies all of the storage contents stored in the first real volume into the first virtual volume is designated by the managing device, the lower communications control part reads out all of the data of the first real volume from the first storage device, and the higher communications control part refers to the mapping table and writes this read-out data into the second real volume.

Furthermore, the first storage control device and second storage control device can respectively hold differential control information that controls the differential data between the storage contents of the first real volume and the storage contents of the first virtual volume. Moreover, in cases where the first differential copying mode that copies the differential data into the first virtual volume is designated by the managing device, the lower communications control part reads out the differential data from the first storage device, and the higher communications control part refers to the mapping table and writes this read-out differential data into the second real volume. On the other hand, in cases where the second differential copying mode that copies the differential data into the first real volume is designated by the managing device, the higher communications control part reads out the differential control information controlled by the second storage control device, refers to this read-out differential control information and the mapping table, and reads out the differential data from the second real volume, and the lower communications control part stores this read-out differential data in the first storage device.

The present invention may also be understood as the invention of a storage control device. Moreover, the present invention may also be understood as a copying control method for a storage control device. Specifically, for example, this copying control method can be constructed so as to comprise the steps of mapping the second real volume of a second storage control device into the first virtual volume of a first storage control device, setting the abovementioned first virtual volume and the first real volume of the abovementioned first storage control device as a copying pair, and causing the storage contents of the abovementioned first virtual volume and the abovementioned first real volume to coincide.

There may be cases in which all or part of the means, functions and steps of present invention can be constructed as computer programs that are executed by a computer system. In case where all or part of the construction of the present invention is constructed from computer programs, these computer programs can be fixed (for example) on various types of storage media and distributed (or the like); alternatively, these computer programs can also be transmitted via communications networks.

BRIEF DESCRIPTION OF THE DRAWINGS

FIG. 5 is an explanatory diagram which shows an example of the construction of the mapping table;

FIG. 8 is an explanatory diagram showing an example of the construction of the copying pair control table;

FIG. 9 is an explanatory diagram showing an example of the construction of the access attribute control table;

DESCRIPTION OF THE PREFERRED EMBODIMENTS

Figure 1:
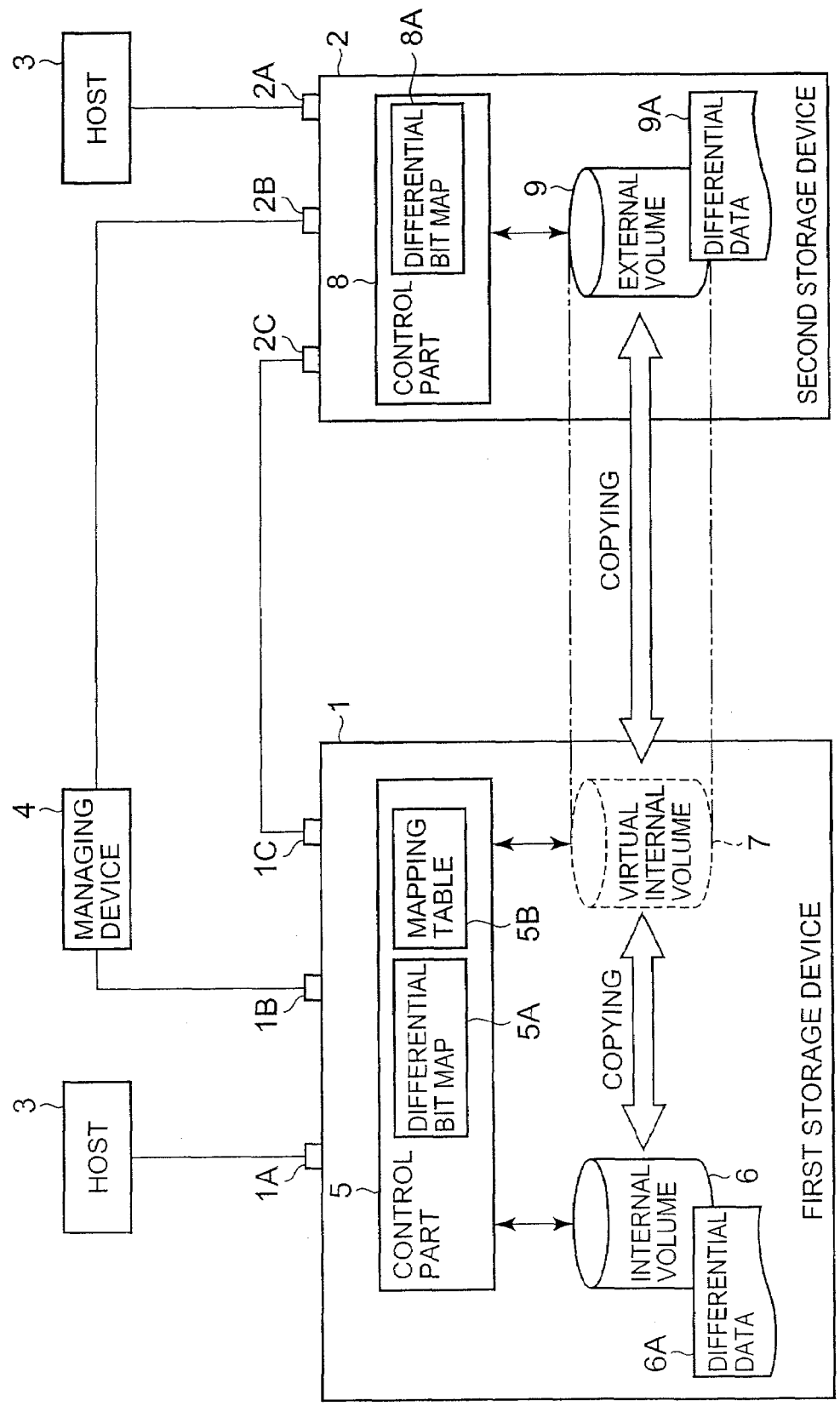
FIG. 1 is a block diagram which shows the overall construction of a storage system constituting an embodiment of the present invention.

FIG. 1 is a structural explanatory diagram which shows an overall outline of an embodiment of the present invention. In this embodiment, as will be described later, [the storage system] maps a storage device present on the outside into its own intermediate storage device (VDEV), thus incorporating this external storage device as thought this device were its own internal volume, and provides this volume to a host.

For example, the storage system of the present embodiment can comprise a first storage device 1 which is one example of a first storage control device, a second storage device 2 which is one example of a second storage control device, a host 3 which acts as a higher device, and a managing device 4.

For example, the first storage device 1 is constructed as a disk array device. The first storage device 1 comprises three communications ports 1A through 1C; the host 3, managing device 4 and second storage device 2 are communicably connected by means of these respective communications ports. Here, for example, data communications can be performed between the respective storage devices 1 and 2, and the respective storage devices 1 and 2 and the host 3, on the basis of a fiber channel protocol.

Furthermore, for example, data communications can be performed between the respective storage devices 1 and 2 and the managing device 4 on the basis of a TCP/IP (transmission control protocol/internet protocol). However, the above are examples; the present invention is not restricted in terms of the type of protocol used.

The first storage device 1 can comprise a control part 5, an internal volume 6 used as a first real volume, and a virtual internal volume 7 used as a first virtual volume. The control part 5 respectively controls the exchange of data inside the first storage device and the exchange of data with the outside. The internal volume 6 is disposed on the basis of a physical storage device (e.g., a disk drive) disposed inside the first storage device 1. The virtual internal volume 7 has a virtual existence; the entity that stores data is present inside the second storage device 2. Specifically, the virtual internal volume 7 is constructed by mapping an external volume 9 of the second storage device 2 into a specified level of the storage hierarchy of the first storage device 1.

The control part 5 comprises a differential bit map 5A and a mapping table 5B. The differential bit map 5A comprises information that is used to control the differential between the storage contents of the internal volume 6 and the storage contents of the virtual internal volume 7 (external volume 9). When the host 3 updates the storage contents of the internal volume 6 after the internal volume 6 and virtual internal volume 7 have been synchronized, differential data 6A is generated by this updating. The differential bit map 5A comprises information that is used to control this differential data 6A. The mapping table 5B comprises information that is used to associate the external volume 9 with the virtual internal volume 7; for example, this information includes path information or the like that is used to access the external volume 9.

The second storage device 2 is communicably connected with the host 3, managing device 4 and first storage device 1, respectively via respective communications ports 2A through 2C. For example, the second storage device 2 can be constructed so that this device comprises a control part 8 and an external volume 9. The control part 8 respectively controls the exchange of data within the second storage device 2 and the exchange of data with the outside. The external volume 9 is disposed on the basis of a physical storage device disposed inside the second storage device 2. Since the volumes of the second storage device 2 are present on the outside as seen from the first storage device 1, these volumes are called external volumes here. Furthermore, the control part 8 comprises a differential bit map 8A that is used to control the differential data 9A that is generated in the external volume 9.

In the present embodiment, the internal volume 6 and virtual internal volume 7 form a copying pair. Either of these volumes may be the copying source, and either of the volumes may be the copying destination. In regard to the method used to synchronize the storage contents, there is full copying in which all of the storage contents of the copying source volume are copied into the copying destination volume, and differential copying in which the only the differential data between the copying source volume and copying destination volume is copied; either of these methods may be employed.

In cases where data is copied from the internal volume 6 into the virtual internal volume 7, the control part 5 refers to the mapping table 5B, acquires path information relating to the path to the external volume 9 which is the entity of the of the virtual internal volume 7, and transfers data to the external volume 9. Similarly, furthermore, in cases where data is copied from the virtual internal volume 7 into the internal volume 6, the control part 5 refers to the mapping table 5B, acquires path information relating to the path to the external volume 9, and writes data read out from the external volume 9 into the internal volume 6.

In the present embodiment, even in cases where the first storage device 1 incorporates the external volume 9 of the second storage device 2 as its own virtual internal volume 7, the data of the internal volume 6 and the data of the virtual internal volume 7 can be synchronized. The present embodiment will be described in greater detail below.

1. First Embodiment

Figure 2:
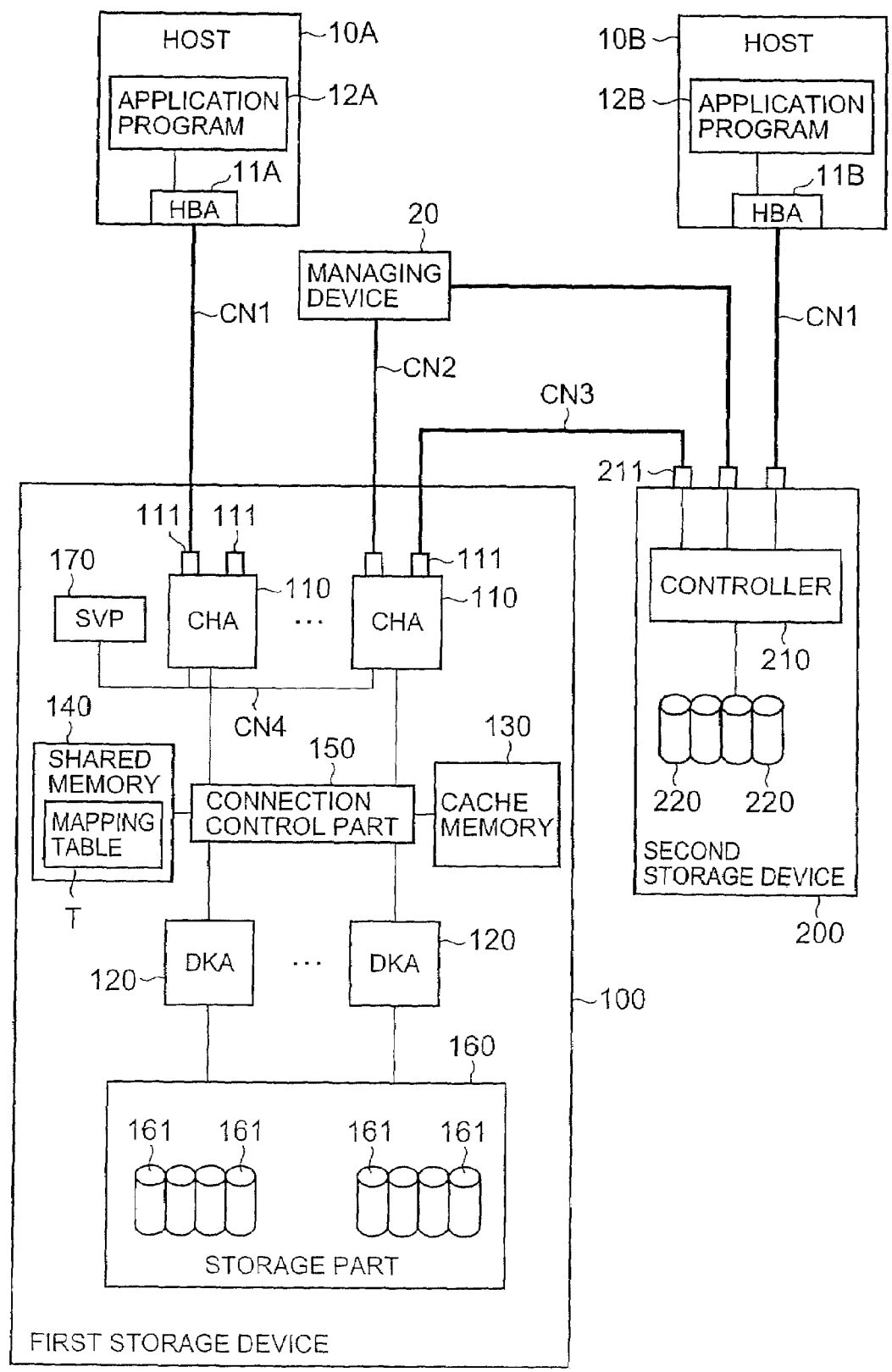
FIG. 2 is a block diagram of the storage system.

FIG. 2 is a block diagram which shows the construction of the essential parts of the storage system of the present embodiment. For example, the hosts 10A and 10B are computer devices comprising information processing resources such as a CPU (central processing unit), memory and the like; for instance, these hosts are constructed as personal computers, workstations, main frames or the like.

The host 10A comprises an HBA (host bus adapter) 11A that is used to access a first storage device 100 via a communications network CN1, and (for example) an application program 12A such as data base software or the like. Similarly, the host 10B also comprises an HBA 11B that is used to access a second storage device 200, and an application program 12B. Below, in cases where no particular distinction is made between the respective hosts 10A and 10B, these parts will be referred to simply as hosts 10, HBA 11 and application programs 12.

For example, depending on the case, an LAN (local area network), an SAN (storage area network), the internet, a dedicated circuit, a public circuit or the like can be appropriately used as the communications network CN1. For example, data communications via an LAN are performed according to a TCP/IP protocol. In cases where the hosts 10 are connected to the first storage device 100 [and second storage device] 200 via an LAN, the hosts 10 request data input and output in file units by designating file names.

On the other hand, in cases where the hosts 10 are connected to the first storage device 100 [and second storage device] 200 via an SAN, the hosts 10 request data input and output with blocks (which are the units of data control of the storage regions provided by a plurality of disk storage devices (disk drives)) in accordance with a fiber channel protocol. In cases where the communications network CN1 is an LAN, the HBA 11 is (for example) a network card corresponding to this LAN. In cases where the communications network CN1 is an SAN, the HBA 11 is (for example) a host bus adapter.

The managing device 20 is a computer device which is used to control the construction of the storage system and the like. For example, this device is operated by a user such as a system manager or the like. The managing device 20 is respectively connected to the respective storage devices 100 and 200 via a communications network CN2. As will be described later, the managing device 20 issues instructions relating to the formation of copying pairs, access attributes and the like to the respective storage devices 100 and 200.

For example, the first storage device 100 is constructed as a disk array subsystem. However, the present invention is not limited to this; the first storage device 100 can also be constructed as a highly functionalized intelligent type fiber channel switch. As will be described later, the first storage device 100 can provide the memory resources of the second storage device 200 to the host 10 as its own logical volume (logical unit).

The first storage device 100 can be divided into two main parts, i.e., a controller and a storage part 160. For example, the controller comprises a plurality of channel adapters (hereafter referred to as "CHAs") 110, a plurality of disk adapters (hereafter referred to as "DKAs") 120, a cache memory 130, a shared memory 140, and a connection control part 150.

Each CHA 110 performs data communications with a host 10. Each CHA 110 comprises a communications port 111 for performing communications with this host 10. The respective CHAs 110 are constructed as microcomputer systems comprising a CPU, memory and the like; these CHAs 110 interpret and execute various types of commands received from the hosts 10. Network addresses used to discriminate the respective CHAs 110 (e.g., IP addresses or WWN) are assigned to these CHAs 110, and each CHA 110 can behave separately as an NAS (network attached storage). In cases where a plurality of hosts 10 are present, the respective CHAs 110 separately receive and process requests from the respective hosts 10.

Each DKA 120 exchanges data with a disk drive 161 of the control part 160. Like the CHAs 110, each DKA 120 is constructed as a microcomputer system comprising a CPU, memory and the like. For example, the respective DKAs 120 write data received from the host 10 or read out from the second storage device 200 by the CHAs 110 into a specified address of a specified disk drive 161. Furthermore, each DKA 120 reads out data from a specified address of a specified disk drive 161, and transmits this data to a host 10 or the second storage device 200. In cases where the input or output of data is performed with the disk drive 161, each DKA 120 converts the logical address into a physical address. In cases where the disk drive 161 is controlled in accordance with an RAID, each DKA 120 accesses data according to the RAID construction. For example, each DKA 120 writes the same data into different disk drive groups (RAID groups), or performs parity calculations and writes the data and parity into the disk drive groups.

The cache memory 130 stores data received from the host 10 or second storage device 200, or stores data read out from the disk drive 161. As will be described later, a virtual intermediate storage device is constructed utilizing the storage space of the cache memory 130.

Various types of control information used in the operation of the first storage device 100 are stored in the shared memory (also called a control memory in some cases) 140. Furthermore, in addition to the setting of a work region, various types of tables such as the mapping table and the like described later are also stored in the shared memory 140.

Moreover, one or a plurality of disk drives 161 can also be used as cache disks. Furthermore, the cache memory 130 and shared memory 140 can be constructed as respectively separate memories, or some of the storage regions of the same memory can be used as cache regions, and other storage regions can be used as control regions.

The connection control part 150 connects the respective CHAs 110, the respective DKAs 120, the cache memory 130 and the shared memory 140 to each other. For example, the connection control part 150 can be constructed as a high-speed bus such as an ultra-high-speed cross-bar switch that performs data transfer by means of a high-speed switching operation.

The storage part 160 comprises a plurality of disk drives 161. For example, various types of storage disks such as hard disk drives, flexible disk drives, magnetic disk drives, semi-conductor memory drives, optical disk drives or the like, or the equivalents of such drives, can be used as the disk drives 161. Furthermore, for example, different types of disks may be mixed inside the storage part 160, as in FC (fiber channel) disks, SATA (serial AT attachment) disks or the like.

Furthermore, as will be described later, a virtual internal volume 191 based on a disk drive 220 of the second storage device 200 can be formed in the first storage device 100. This virtual internal volume 191 can be provided to the host 10A in the same manner as the internal volume 190 based on the disk drive 161.

For example, the second storage device 200 comprises a controller 210 and a plurality of disk drives 220. The second storage device 200 is communicably connected with the host 10B, managing device 20 and first storage device 100, respectively via the communications port 211.

The second storage device 200 and host 10B are connected via the communications network CN1. The second storage device 200 and managing device 20 are connected via the communications network CN2. The second storage device 200 and first storage device 100 are connected via the communications network CN3. For example, the communications networks CN2 and CN3 can be constructed from SAN, LAN or the like.

The second storage device 200 may have substantially the same construction as the first storage device, or may have a simpler construction than the first storage device 100. The disk drives 220 of the second storage device 200 may be handled as internal storage devices of the first storage device 100.

Figure 3:
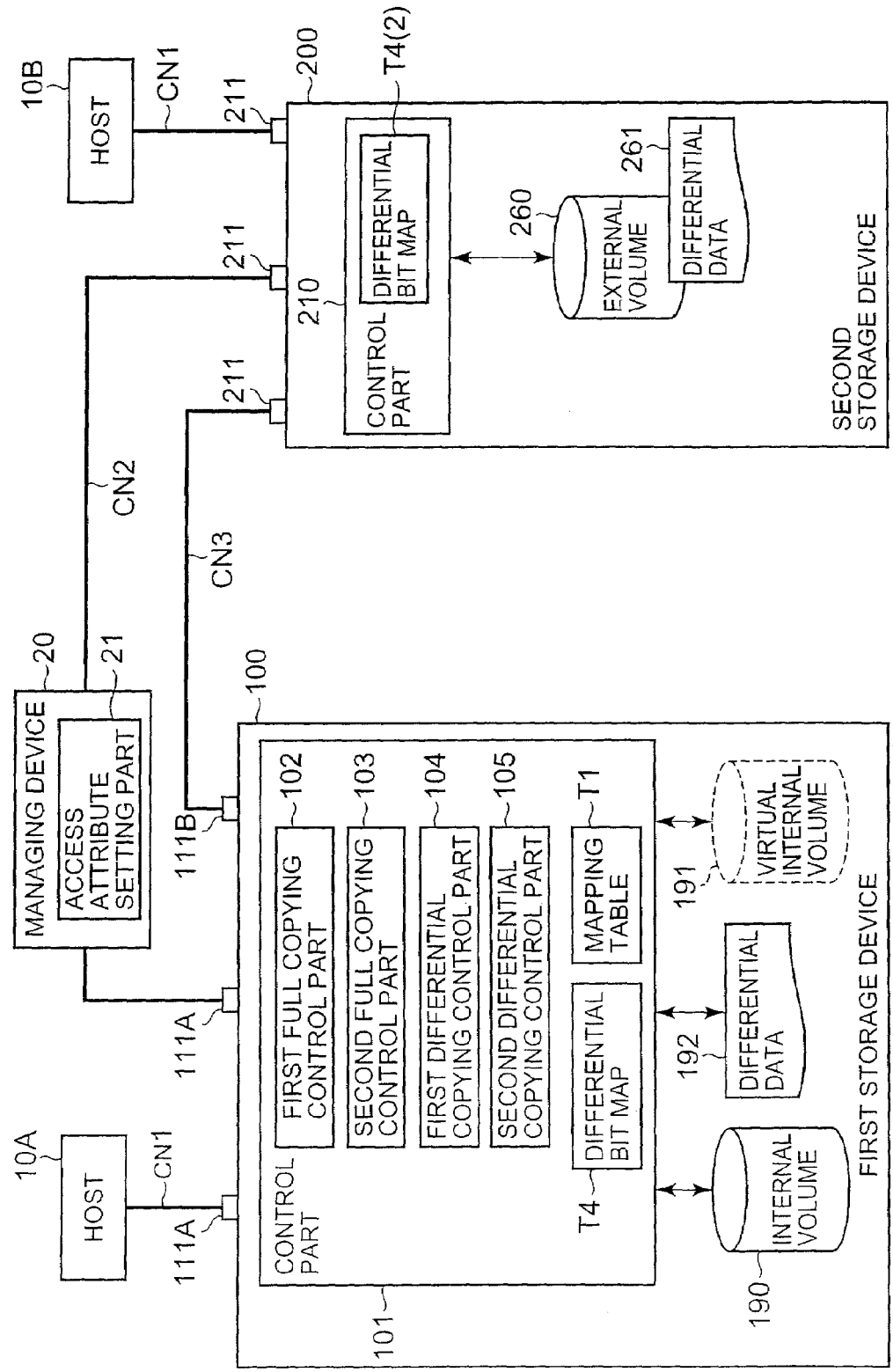
FIG. 3 is an explanatory diagram which shows an outline of the functional construction of the storage system.

Reference is now made to FIG. 3. FIG. 3 is a structural explanatory diagram focusing on the functional construction of the present embodiment. The controller 101 of the first storage device 100 is constructed from the CHAs 110, respective DKAs 120, cache memory 130, shared memory 140 and the like.

As internal functions, this controller 101 comprises (for example) a first full copying control part 102, a second full copying control part 103, a first differential copying control part 104, and a second differential copying control part 105. Furthermore, various types of tables such as a mapping table T1, differential bit map T4 and the like are stored inside the shared memory 140 of the controller 101.

The first full copying control part 102 is a function that copies all of the storage contents of the virtual internal volume 191 into the internal volume 190. Conversely, the second full copying control part 103 is a function that copies all of the storage contents of the internal volume 190 into the virtual internal volume 191. Furthermore, the first differential copying control part 104 is a control that copies the differential data 192 of the internal volume 190 into the virtual internal volume 191. The second differential copying control part 105 is a function that copies the differential data 261 of the virtual internal volume 191 into the internal volume 190.

The internal volume 190 and virtual internal volume 191 are respectively disposed in the first storage device 100. The internal volume 190 is a volume that is set on the basis of the storage regions of the respective disk drives 161 that are directly governed by the first storage device 100. The virtual internal volume 191 is a volume that is set on the basis of the storage regions of the respective disk drives 220 of the second storage device 200.

The controller 210 of the second storage device 200 stores the differential bit map T4 (2) in a memory (not shown in the figures). This differential bit map T4 (2) is used to control the differential data 261 that is generated for the external volume 260 of the second storage device 200. Here, as was described above, the external volume 260 is based on the storage region of the disk drive 220, and is an internal volume with respect to the second storage device 200. However, since this volume 260 is mapped into the virtual internal volume 191 and incorporated into the first storage device 100, this volume is called the external volume 260 in the present embodiment.

The managing device 20 comprises an access attribute setting part 21. This access attribute setting part 21 is used to set access attributes for the internal volume 190 or external volume 260. The setting of access attributes can be performed manually by the user, or can be performed automatically on the basis of some type of trigger signal. The types of access attributes will be further described later.

Figure 4:
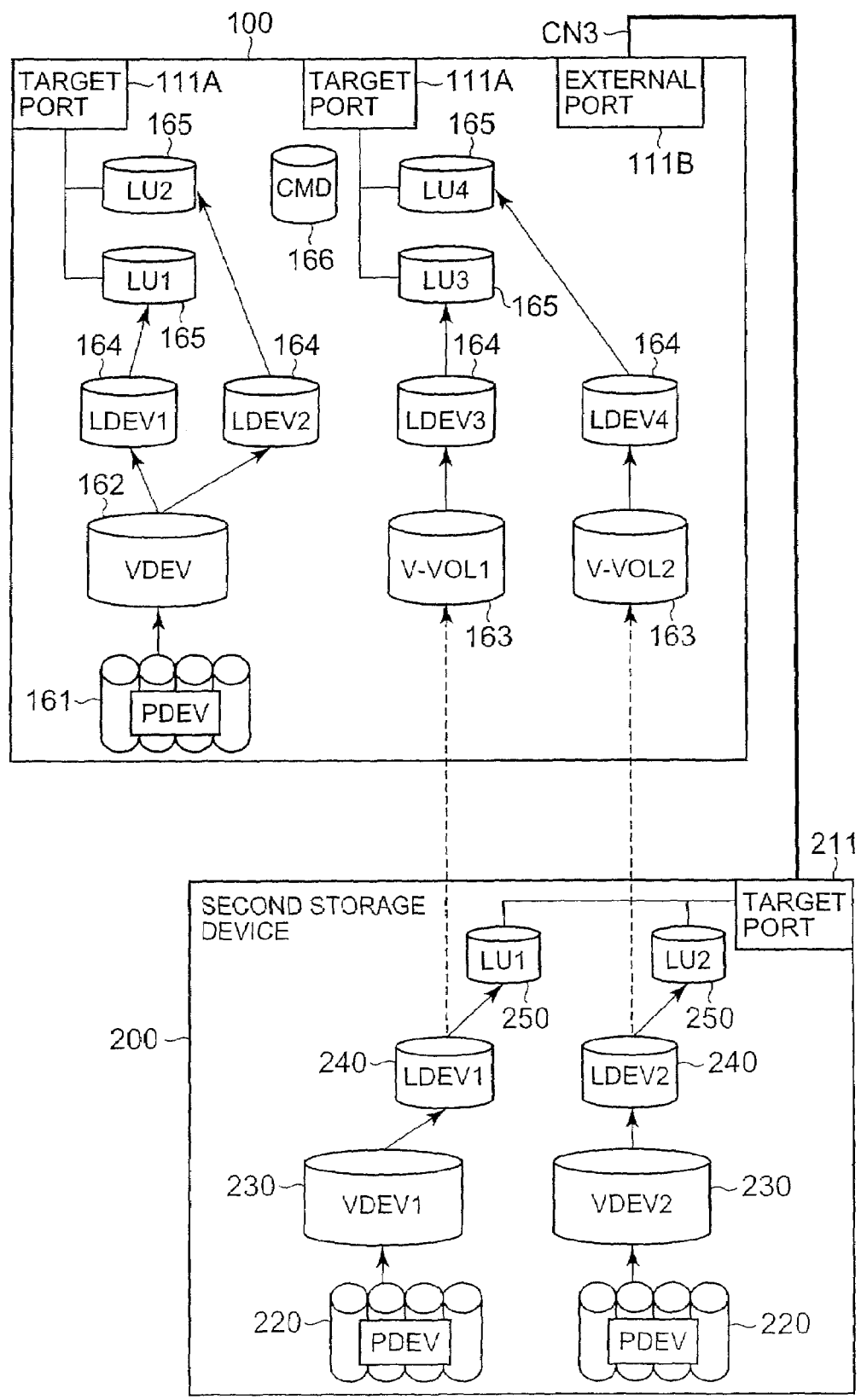
FIG. 4 is an explanatory diagram which shows the storage structure in model form.

Reference is now made to FIG. 4. FIG. 4 is a structural explanatory diagram which focuses on the storage structure of the first storage device 100 and second storage device 200. The construction of the first storage device 100 will be described first.

For example, the storage structure of the first storage device 100 can be roughly divided into a physical storage hierarchy and a logical storage hierarchy. The physical storage hierarchy is constructed by a PDEV (physical device) 161 which is a physical disk. The PDEV corresponds to a disk drive.

The logical storage hierarchy can be constructed from a plurality (e.g., two types) of hierarchies. One logical hierarchy can be constructed from VDEVs (virtual devices) 162 and virtual VDEVs (hereafter called "V-VOLs") 163 which can be handled as VDEVs 162. The other logical hierarchy can be constructed from LDEVs (logical devices) 164.

For example, the VDEVs 162 can be constructed by forming a specified number of PDEVs 161 into a group, e.g., four units as one set (3D+1P), eight units as one set (7D+1P) or the like. One RAID storage region is formed by the aggregate of the storage regions provided by the respective PDEVs 161 belonging to a group. This RAID storage region constitutes a VDEV 162.

In contrast to the construction of a VDEV 162 in a physical storage region, the V-VOL 163 is a virtual intermediate storage device which requires no physical storage region. The V-VOL 163 is not directly associated with a physical storage region, but is a receiver for the mapping of LUs (logical units) of the second storage device 200.

One or more LDEVs 164 can be respectively disposed in the VDEV 162 or V-VOL 163. For example, the LDEVs 164 can be constructed by splitting a VDEV 162 into specified lengths. In cases where the host 10 [involved] is an open type host, the host 10 can recognize the LDEV 164 as a single physical disk by mapping the LDEV 164 in the LU 165. The open type host can access a desired LDEV 164 by designating the LUN (logical unit number) or logical block address. Furthermore, in the case of a main frame type host, the LDEV 164 can be directly accessed.

The LU 165 is a device that can be recognized as an SCSI logical unit. The respective LUs 165 are connected to the host 10 via a target port 11A. One or more LDEVs 164 can be respectively associated with each LU 165. It is also possible to expand the LU size virtually by associating a plurality of LDEVs 164 with one LU 165.

The CMD (command device) 166 is a special LU that is used to transfer commands and status [information] between the I/O control program operating in the host 10 and the controller 101 (CHAs 110, DKAs 210) of the storage device 100. Commands from the host 10 are written into the CMD 166. The controller 101 of the storage device 100 executes processing corresponding to the commands that are written into the CMD 166, and writes the results of this execution into the CMD 166 as status [information]. The host 10 reads out and confirms the status [information] that is written into the CMD 166, and then writes the processing contents that are to be executed next into the CMD 166. Thus, the host 10 can issue various types of instructions to the storage device 100 via the CMD 166.

Furthermore, the commands received from the host 10 can also be processed without being stored in the CMD 166. Moreover, the CMD can also be formed as a virtual device without defining the actual device (LU), and can be constructed so as to receive and process commands from the host 10. Specifically, for example, the CHAs 110 write the commands received from the host 10 into the shared memory 140, and the CHAs 110 or DKAs 120 process the commands stored in this shared memory 140. The processing results are written into the shared memory 140, and are transmitted to the host 10 from the CHAs 110.

The second storage device 200 is connected to the external initiator port (external port) 111B of the first storage device 100 via the communications network CN3.

The second storage device 200 comprises a plurality of PDEVs 220, VDEVs 230 that are set in storage regions provided by the PDEVs 220, and one or more LDEVs 240 that can be set in the VDEVs 230. Each LDEV 240 is respectively associated with an LU 250.

Furthermore, in the present embodiment, the LUs 250 (i.e., the LDEVs 240) of the second storage device 200 are mapped into a V-VOL 163 which is a virtual intermediate storage device so that these LUs 250 can also be used from the first storage device 100.

For example, in FIG. 4, the "LDEV 1" and "LDEV 2" of the second storage device 200 are respectively mapped into the "V-VOL 1" and "V-VOL 2" of the first storage device 100 via the "LU 1" and "LU 2" of the second storage device 200. Furthermore, the "V-VOL 1" and "V-VOL 2" are respectively mapped into the "LDEV 3" and "LDEV 4", and can be utilized via the "LU 3" and "LU 4".

Furthermore, the VDEVs 162 and V-VOLs 163 can use an RAID construction. Specifically, one disk drive 161 can be divided into a plurality of VDEVs 162 and V-VOLs 163 (slicing), or one VDEV 162 or V-VOL 163 can be formed from a plurality of disk drives 161 (striping).

Furthermore, the "LDEV 1" or "LDEV 2" of the first storage device 100 corresponds to internal volume 190 in FIG. 3. The "LDEV 3" or "LDEV 4" of the of the first storage device 100 corresponds to the virtual internal volume 191. The "LDEV 1" or "LDEV 2" of the second storage device 200 corresponds to the external volume 260 in FIG. 3.

Reference is now made to FIG. 5. FIG. 5 shows one example of the mapping table T1 that is used to map the external volume 260 into the virtual internal volume 191.

For example, the mapping table T1 can be constructed by respectively establishing a correspondence between the VDEV numbers used to discriminate the VDEVs 162 and V-VOLs 163 and information relating to the external disk drives 220.

For example, the external device information can be constructed so that this information includes device discriminating information, storage capacities of the disk drives 220, information indicating the type of device (tape type devices, disk type devices or the like) and path information indicating the paths to the disk drives 220. This path information can be constructed so as to include discriminating information (WWN) specific to the respective communications ports 211, and LUN numbers used to discriminate the LUs 250.

Furthermore, the values of the device discriminating information, WWN and the like shown in FIG. 5 are values used for convenience of description, and do not have any particular meaning. Moreover, three items of path information are associated with the VDEV 101 having the VDEV number of "3" shown on the lower side in FIG. 5. Specifically, the external disk drive 220 that is mapped into this VDEV (#3) has an alternate path structure which has three paths inside, and this alternate path structure is deliberately mapped into the VDEV (#3). It is seen that the same storage region can be accessed via any of these three paths; accordingly, even in cases where one or two of the paths are obstructed, the desired data can be accessed via the remaining normal path or paths.

By using a mapping table T1 such as that shown in FIG. 5, it is possible to map one or a plurality of external disk drives 220 into the V-VOL 163 inside the first storage device 100.

Furthermore, as is also true of the other tables shown below, the volume numbers and the like shown in the table are examples used to illustrate the table construction; these values do not particularly correspond to the other constructions shown in FIG. 4 or the like.

Figure 6:
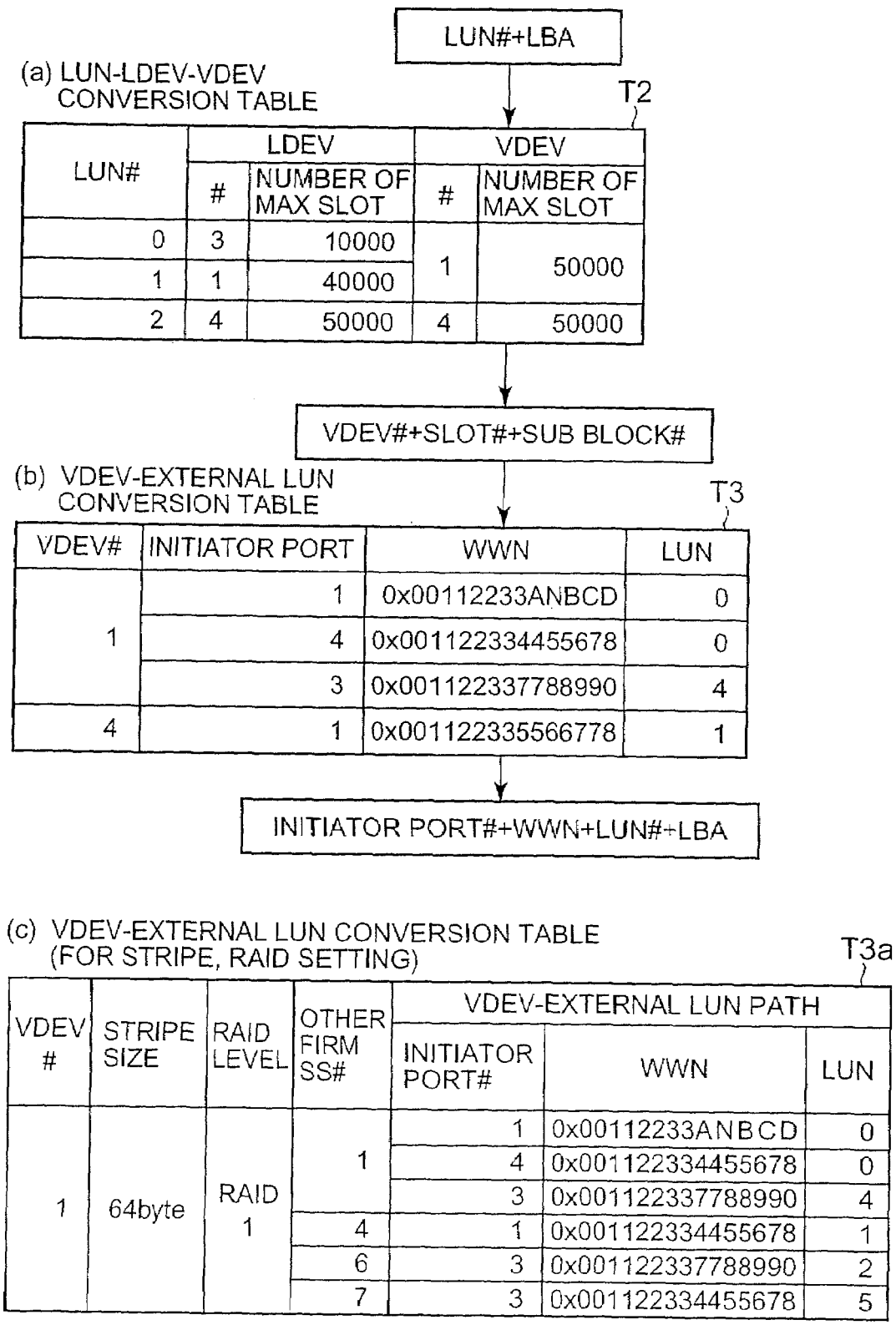
FIG. 6 is an explanatory diagram which shows the conditions of address conversion in a case where data is written into an external volume incorporated as a virtual internal volume.

The conditions of data conversion using these various types of tables will be described with reference to FIG. 6. As is shown in the upper part of FIG. 6, the host 10 transmits data to a specified communications port 111 with the LUN number (LUN #) and logical block address (LBA) being designated.

The first storage device 100 converts the data that is input for LDEV use (LUN #+LBA) into data for VDEV use on the basis of the first conversion table T2 shown in FIG. 6(a). The first conversion table T2 is an LUN-LDEV-VDEV conversion table that is used to convert data that designates LUNs in the first storage device 100 into VDEV data.

For example, this first conversion table T2 is constructed by associating LUN numbers (LUN #), LDEV numbers (LDEV #) and maximum slot numbers that correspond to correspond to these LUNs, VDEV (including V-VOL) numbers (VDEV #) and maximum slot numbers that correspond to these LDEVs and the like. As a result of reference being made to this first conversion table T2, the data from the host 10 (LUN #+LBA) is converted into VDEV data (VDEV #+SLOT #+SUBLOCK #).

Next, the first storage device 100 refers to the second conversion table T3 shown in FIG. 6(b), and converts the VDEV data into data that is used for transmission and storage for the LUNs of the second storage device 200.

In the second conversion table T3, for example, VDEV numbers (VDEV #), the numbers of initiator ports used to transmit data from the VDEVs to the second storage device 200, WWN used to specify the communications ports that are the data transfer destinations and LUNs that can be accessed via these communications ports are associated.

On the basis of this second conversion table T3, the first storage device 100 converts the address information of the data that is to be stored into the format of initiator port number #+WWN+LUN #+LBA. The data whose address information has thus been altered reaches the designated communications port 211 from the designated initiator port via the communications network CN3. Then, the data is stored in a specified place in the LDEV.

FIG. 6(c) shows another second conversion table T3a. This conversion table T3a is used in cases where a stripe or RAID is applied to VDEVs (i.e., V-VOLs) originating in an external disk drive 220. The conversion table T3a is constructed by associating VDEV numbers (VDEV #), stripe sizes, RAID levels, numbers used to discriminate the second storage device 200 (SS # (storage system numbers)), initiator port numbers and WWN and LUN numbers of the communications ports 211.

In the example shown in FIG. 6(c), one VDEV (V-VOL) constructs an RAID 1 utilizing a total of four external storage control devices specified by SS # (1, 4, 6, 7). Furthermore, the three LUNs (#0, #0 and #4) assigned to SS #1 are set in the same device (LDEV #). Moreover, the volumes of LUN #0 comprise an alternate path structure which has two access data paths. Thus, logical volumes (LDEVs) belonging respectively to a plurality of external storage device can be respectively mapped in a single V-VOL inside the first storage device 100, and can be utilized as a virtual internal volume 191. As a result, in the present embodiment, by constructing a VDEV (V-VOL) from a plurality of logical volumes (LDEV) present on the outside, it is possible to add functions such as striping, RAID or the like, and to provide these functions to the host 10.

Figure 7:
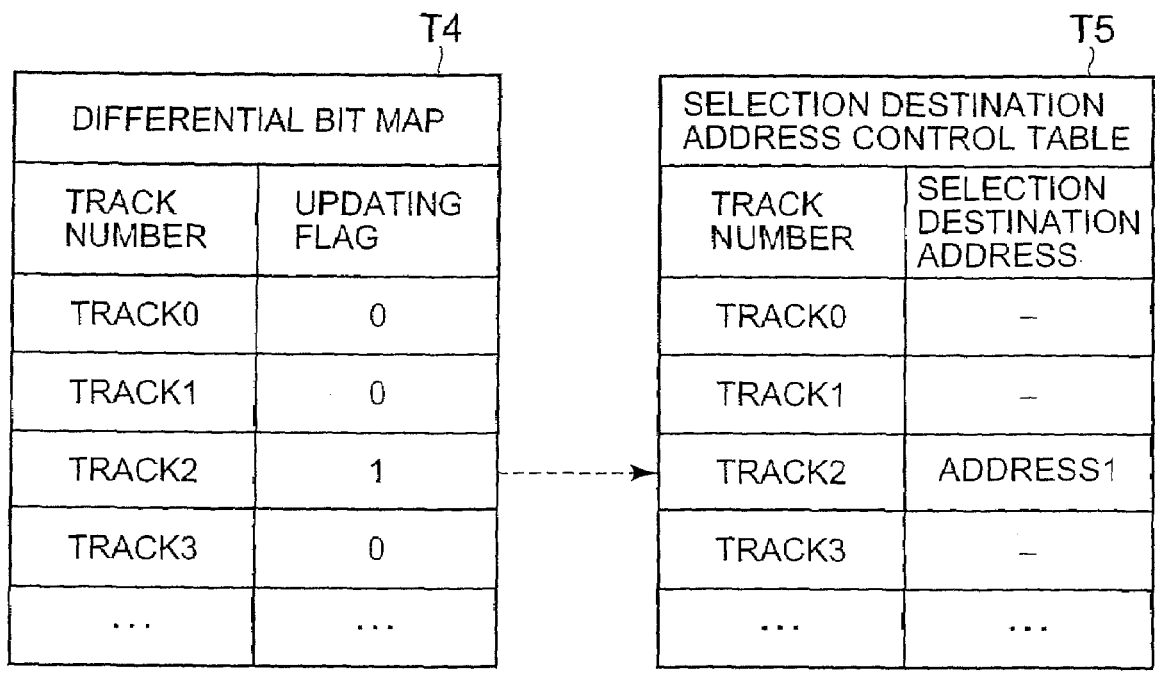
FIG. 7 is an explanatory diagram respectively showing the differential bit map T4 and saving destination address control map T5 used to control the differential data.

FIG. 7 respectively shows a differential bit map T4 and saving destination address control table T5 that are used to control the differential data 192. Furthermore, in the second storage device 200 as well, differential data 261 is controlled by the same method as in FIG. 7.

For example, the differential bit map T4 can be constructed by associating updating flag information indicating the status as to whether or not updating has been performed with each logical track of the disk drives 161 constituting the internal volume 190. One logical track corresponds to three cache segments, and has size of 48 kB or 64 kB.

For example, the saving destination address control table can be constructed by associating with each logical track unit a saving destination address which indicates where the data stored on this track is saved. Furthermore, in the tables T4 and T5, the control units are not limited to track units. For example, other control units such as slot units, LBA units or the like can also be used.

FIG. 8 is an explanatory diagram which shows one example of the copying pair control table T6. For example, the copying pair control table T6 can be constructed by associating information that specifies the copying source LU, information that specifies the copying destination LU and the current pair status. Examples of copying pair status include "pair form (paircreate)", "pair split (pairsplit)", "resynchronize (resync)" and the like.

Here, the "pair form" status is a state in which initial copying (full copying) from the copying source volume to the copying destination volume has been performed, so that a copying pair is formed. The "pair split" status is a state in which the copying source volume and copying destination volume are separated after the copying pair has been forcibly synchronized. The "resynchronize" status is a state in which the storage contents of the copying source volume and copying destination volume are resynchronized and a copying pair is formed after the two volumes have been separated.

FIG. 9 is an explanatory diagram showing one example of the access attribute control table T7. The term "access attribute" refers to information that controls the possibility of access to the volumes or the like. For example, the access attribute control table T7 can be constructed by associating access attributes with each LU number (LUN).

Examples of access attributes include "read/write possible", "write prohibited (read only)", "read/write impossible", "empty capacity 0", "copying destination setting impossible" and "hidden".

Here, "read/write possible" indicates a state in which reading and writing from and into the volume in question are possible. "Write prohibited" indicates a state in which writing into the volume in question is prohibited, so that only read-out is permitted. "Read/write impossible" indicates a state in which writing and reading into and from the volume are prohibited. "Empty capacity 0" indicates a state in which a response of remaining capacity 0 (full) is given in reply to inquiries regarding the remaining capacity of the volume even in cases where there is actually some remaining capacity. "Copying destination setting impossible" indicates a state in which the volume in question cannot be set as the copying destination volume (secondary volume). "Hidden" indicates a state in which the volume in question cannot be recognized from the initiator. Furthermore, as was already mentioned above, the LUNs in the table are numbers used for purposes of description; these numbers in themselves have no particular significance.

Figure 10:
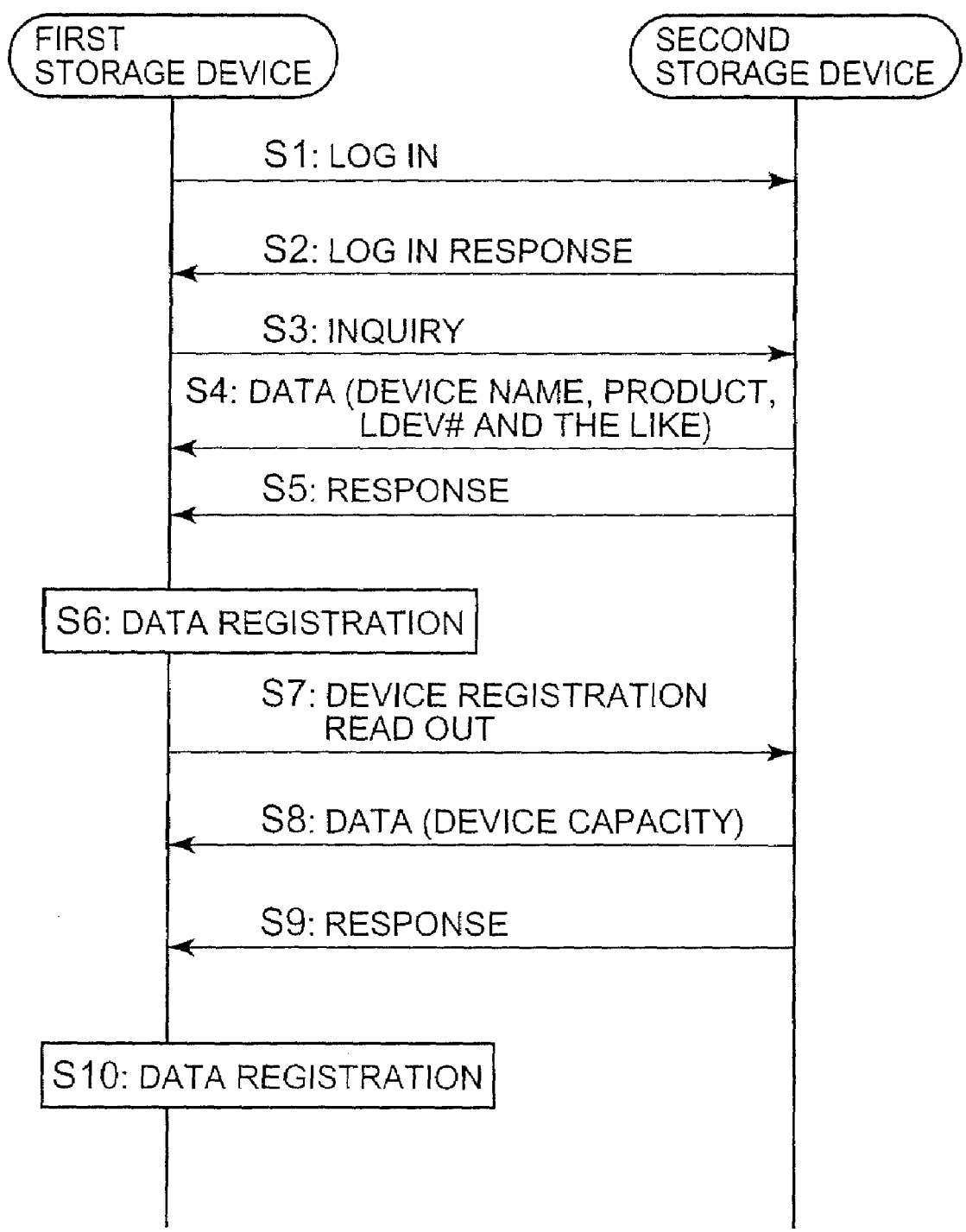
FIG. 10 is an explanatory diagram showing the flow of the processing that is used to construct the mapping table.

Next, the operation of the present embodiment will be described. First, FIG. 10 is a flow chart illustrating the mapping method that is used in order to utilize the external volume 260 of the second storage device 200 as a virtual internal volume 191 of the first storage device 100. This processing is performed between the first storage device 100 and second storage device 200 when the mapping of the volumes is performed.

The first storage device 100 logs into the second storage device 200 via the initiator port of the CHA 110 (S1). Logging in is completed by the second storage device 200 sending back a response to the logging in of the first storage device 100 (S2). Next, for example, the first storage device 100 transmits an inquiry command determined by the SCSI (small computer system interface) to the second storage device 200, and requests a response regarding details of the disk drives 220 belonging to the second storage device 200 (S3).

The inquiry command is used to clarify the type and construction of the inquiry destination device; this makes it possible to pass through the hierarchy of the inquiry destination device and grasp the physical structure of this inquiry destination device. By using such an inquiry command, for example, the first storage device 100 can acquire information such as the device name, device type, manufacturing serial number (product ID), LDEV number, various types of version information, vendor ID and the like from the second storage device 200 (S4). The second storage device 200 responds by transmitting the information for which an inquiry was made to the first storage device 100 (S5).

The first storage device 100 registers the information acquired from the second storage device 200 in the mapping table T1 (S6). The first storage device 100 reads out the storage capacity of the disk drive 220 from the second storage device 200 (S7). In response to an inquiry from the first storage device 100, the second storage device 200 sends back the storage capacity of the disk drive 220 (S8), and returns a response (S9). The first storage device 100 registers the storage capacity of the disk drive 220 in a specified place in the mapping table T1 (S10).

The mapping table T1 can be constructed by performing the above processing. In cases where the input and output of data are performed with the external disk drive 220 (external LUN, i.e., external volume 260) mapped into the V-VOL of the first storage device 100, address conversion and the like are performed with reference to the other conversion tables T2 and T3 described with reference to FIG. 6.

Next, the input and output of data between the first storage device 100 and second storage device 200 will be described. FIG. 11 is a model diagram which shows the processing that is performed when data is written.

The host 10 can write data into a logical volume (LDEV) that has access authorization. For example, by using procedures such as zoning that sets a virtual SAN sublet in the SAN or LUN masking in which the host 10 holds a list of accessible LUNs, it is possible to set the host 10 so that the host 10 can access only specified LDEVs.

In cases where the LDEV into which the host 10 is to write data is connected via a VDEV to a disk drive 161 which is in internal storage device, data is written by ordinary processing. Specifically, the data from the host 10 is temporarily stored in the cache memory 130, and is then stored in a specified address of a specified disk drive 161 from the cache memory 130 via the DKA 120. In this case, the DKA 120 converts the logical address into a physical address. Furthermore, in the case of a raid construction, the same data is stored in a plurality of disk drives 161 or the like.

Figure 11A:
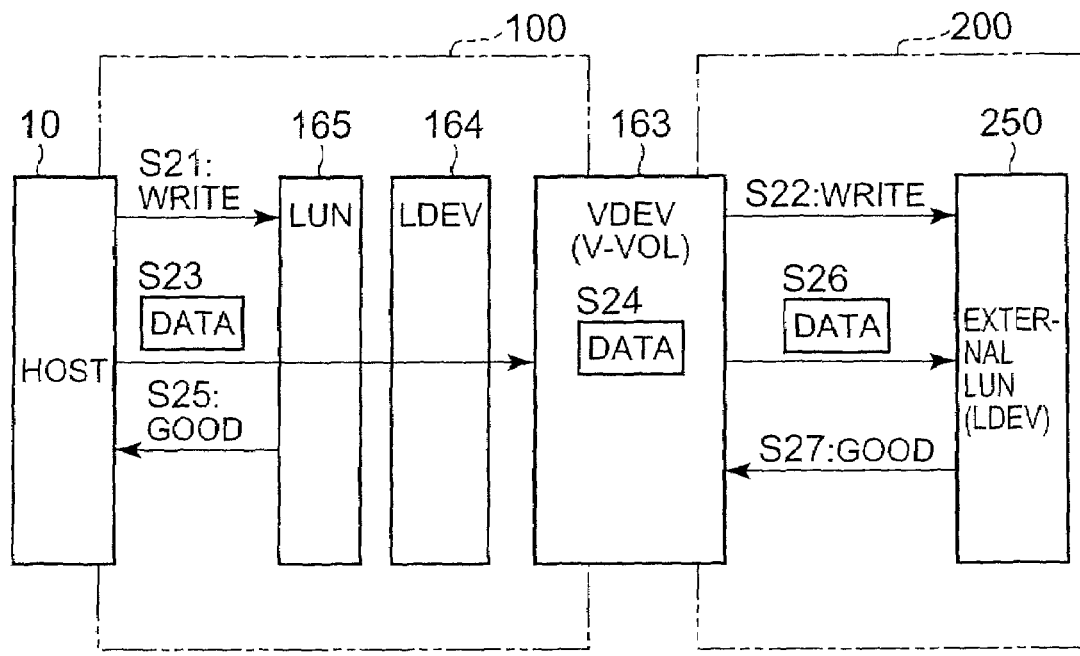
FIG. 11 is schematic diagram showing a case in which data is written into an external storage device used as a virtual internal volume.
Figure 11B:
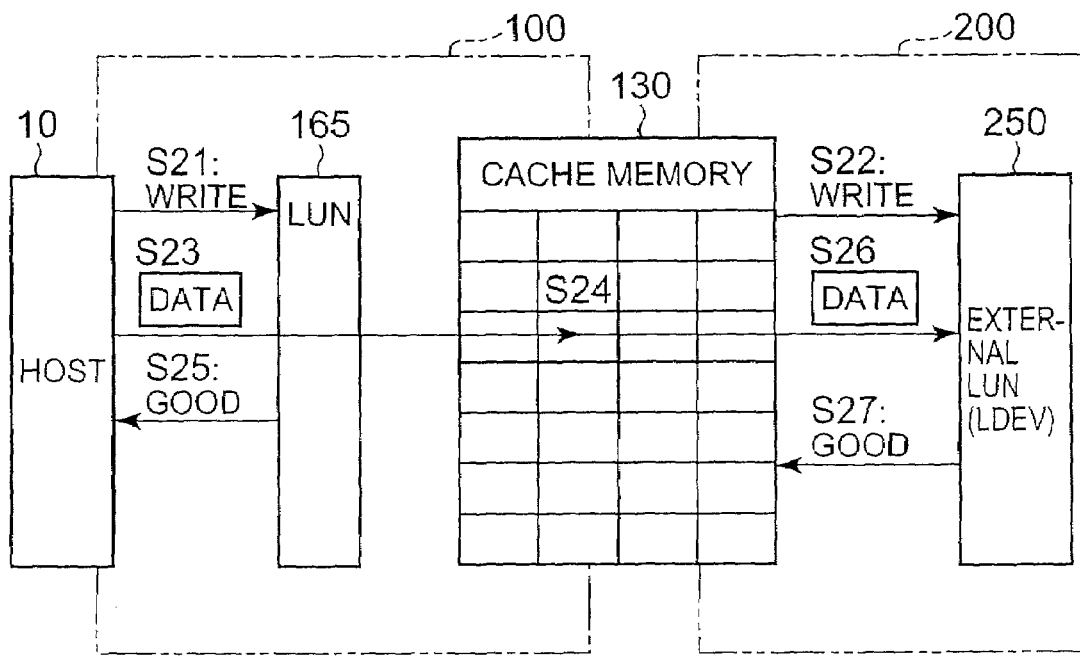

On the other hand, in cases where the LDEV into which the host 10 is to write data is connected to an external disk drive 220 via a V-VOL, the flow is as shown in FIG. 11. FIG. 11(a) is a flow chart centering on the storage hierarchy, and FIG. 11(b) is a flow chart centering on the manner of use of the cache memory 130.

The host 10 indicates an LDEV number that specifies the LDEV that is the object of writing and a WWN that specifies the communications port that is used to access this LDEV, and issues a write command (write) (S21). When the first storage device 100 receives a write command from the host 10, the first storage device 100 produces a write command for transmission to the second storage device 200, and transmits this command to the second storage device 200 (S22). The first storage device 100 alters the address information and the like contained in the write command received from the host 10 so as to match the external volume 260, thus producing a new write command.

The host 10 transmits the write data to the to the first storage device 100 (S23). The write data received by the first storage device 100 is transferred to the second storage device 200 (S26) from the LDEV via the V-VOL (S24). Here, at the point in time at which the data from the host 10 is stored in the cache memory 130, the first storage device 100 sends back a response (good) indicating the completion of writing to the host 10.

At the point in time at which the write data is received from the first storage device 100 (or the point in time at which writing into the disk drive 220 is completed), the second storage device 200 transmits a writing completion report to the first storage device 100 (S26). Specifically, the time at which the completion of writing is reported to the host 10 by the first storage device 100 (S25) and the time at which the data is actually stored in the disk drive 220 are different (asynchronous system). Accordingly, the host 10 is released from data write processing before the write data is actually stored in the disk drive 220, so that the host 10 can perform other processing.

Reference will now be made to FIG. 11(b). Numerous subprograms are installed in the cache memory 130. The first storage device 100 converts the logical block addresses designated by the host 10 into sub-block addresses, and stores data in specified locations in the cache memory 130 (S24). In other words, the V-VOLs and VDEVs have a logical presence installed in the storage space of the cache memory 130.

The flow in cases where data is read out from the external volume 260 of the second storage device 200 will be described with reference to FIG. 12.

First, the host 10 designates a communications port 111 and transmits a data read-out command to the first storage device 100 (S31). When the first storage device 100 receives a read command, the first storage device 100 produces a read command in order to read out the requested data from the second storage device 200.

The first storage device 100 transmits the produced read command to the second storage device 200 (S32). In accordance with the read command received from the first storage device 100, the second storage device 200 reads out the requested data from the disk drive 220, transmits this read-out data to the first storage device 100 (S33), and reports that read-out was normally completed (S35). As is shown in FIG. 12(b), the first storage device 100 stores the data received from the second storage device 200 in a specified location in the cache memory 130 (S34).

The first storage device 100 reads out the data stored in the cache memory 130, performs address conversion, transmits the data to the host 10 via the LUN 103 or the like (S36), and issues a read-out completion report (S37). In the series of processing performed in these data read-outs, the conversion operation described with reference to FIG. 6 is performed in reverse.

Figure 12A:
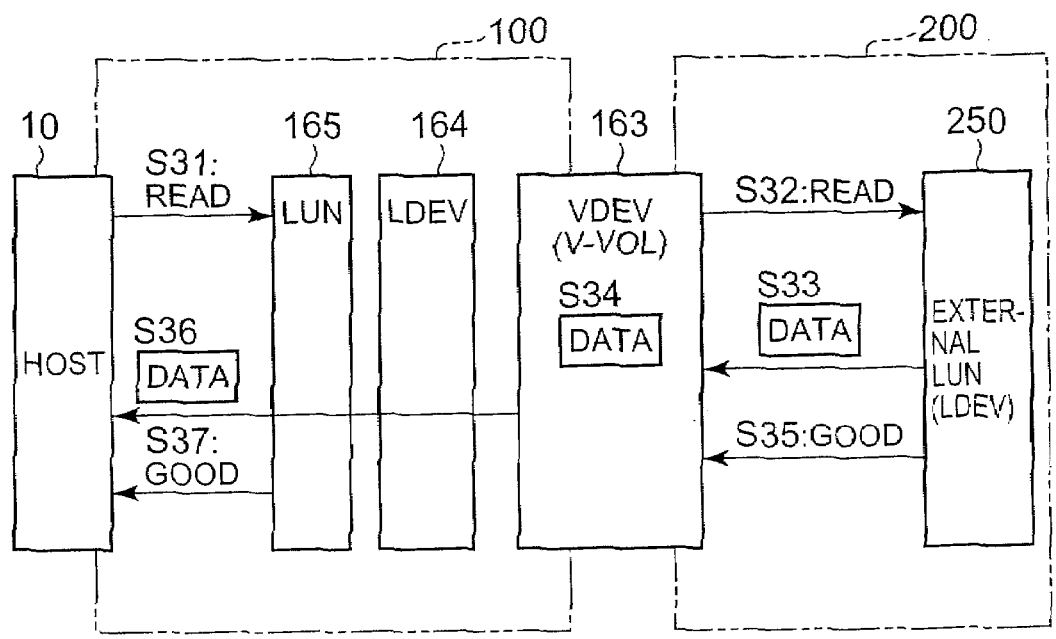
FIG. 12 is a schematic diagram showing a case in which data is read out from an external storage device used as a virtual internal volume.
Figure 12B:
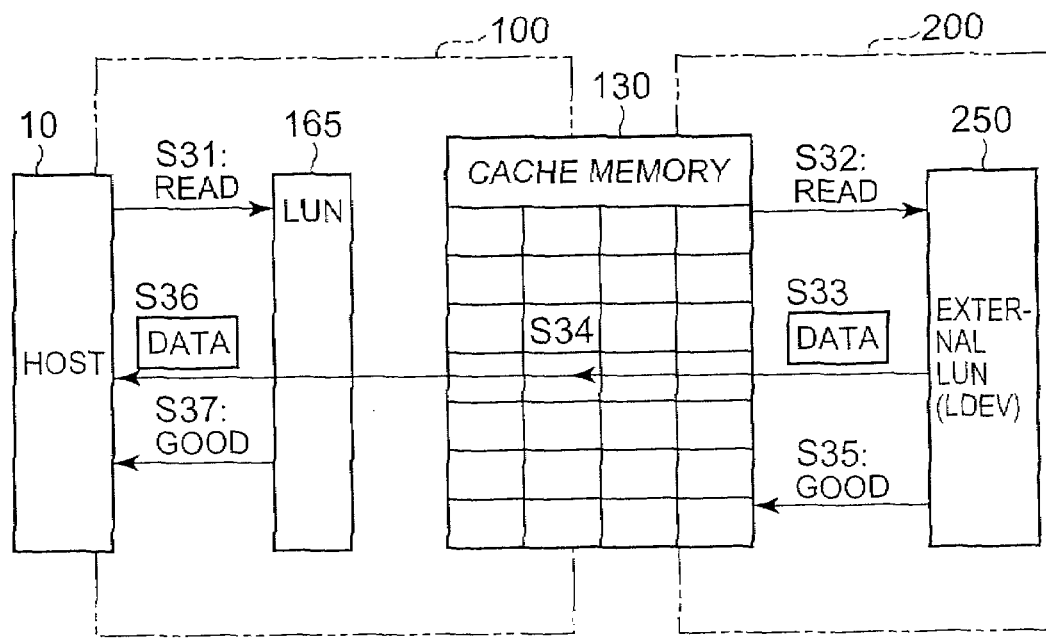

In FIG. 12, the operation is shown as if data is read out from the second storage device 200 and stored in the cache memory 130 in accordance with the request from the host 10. However, the operation is not limited to this; it would also be possible to store all or part of the data stored in the external volume 260 in the cache memory 130 beforehand. In this case, in response to a command from the host 10, data can be immediately read out from the cache memory 130 and transmitted to the host 10.

Figure 13:
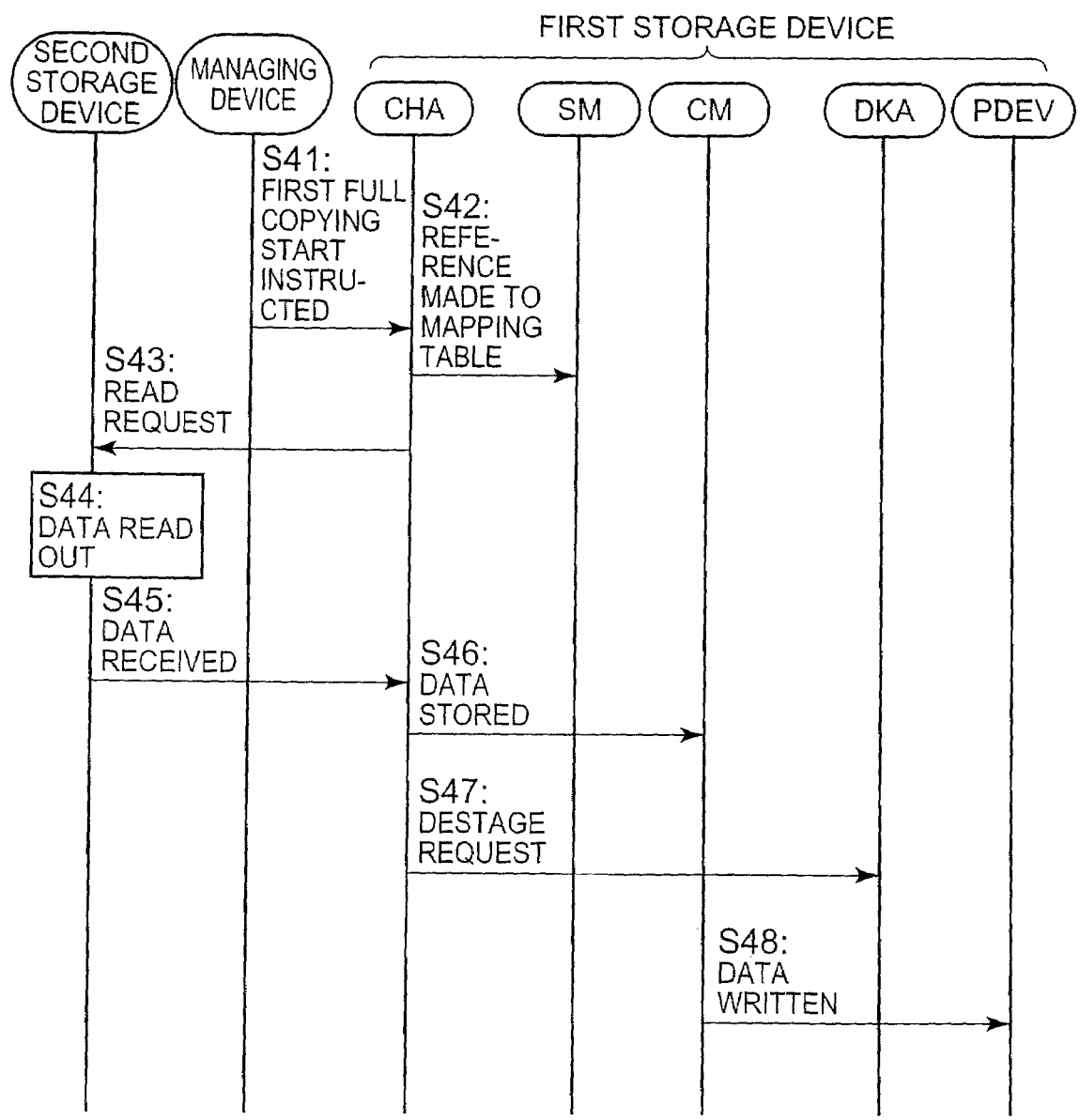
FIG. 13 is a sequence flow chart showing the flow of the first full copying mode.
Figure 14:
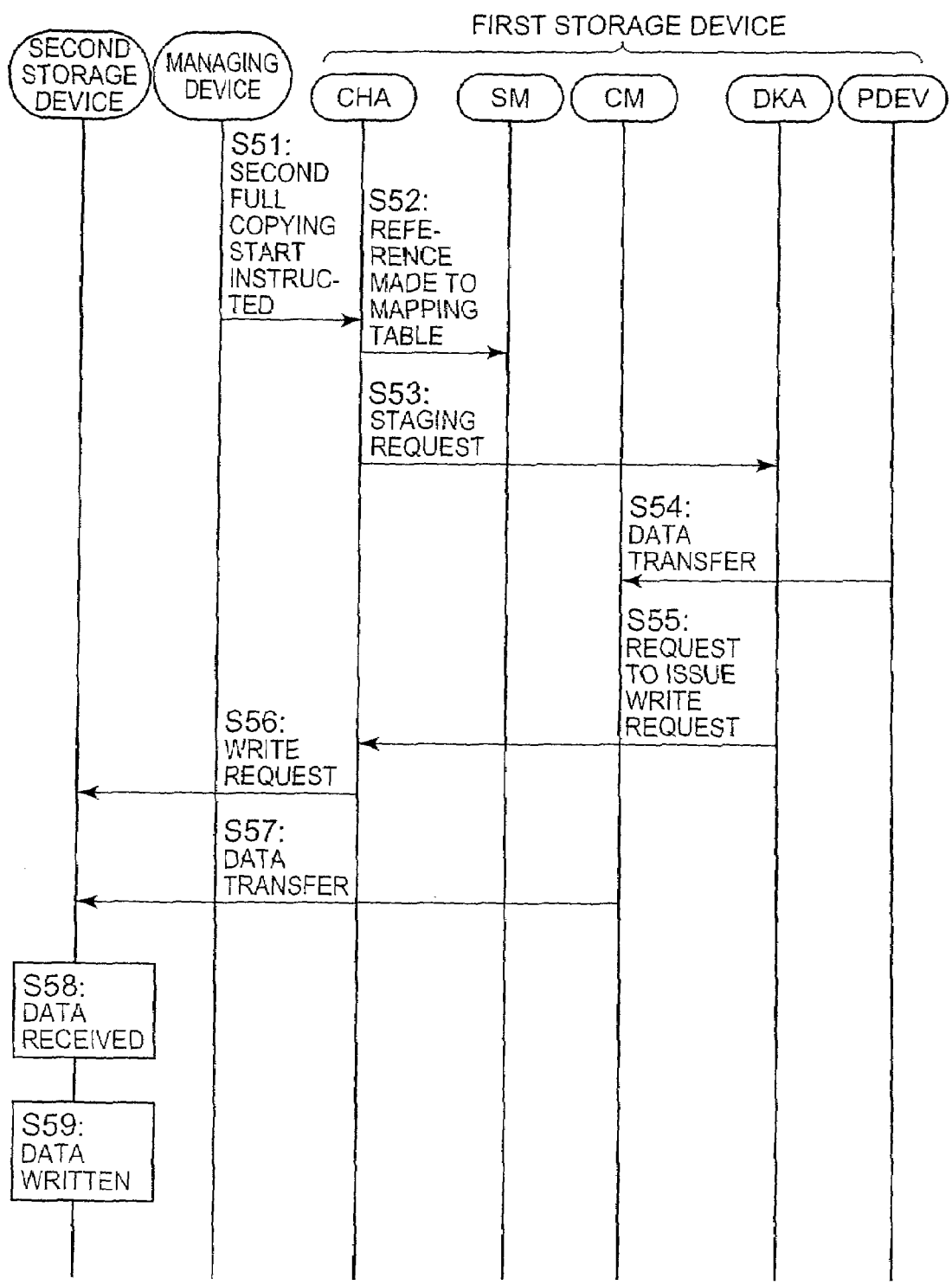
FIG. 14 is a sequence flow chart showing the flow of the second full copying mode.
Figure 15:
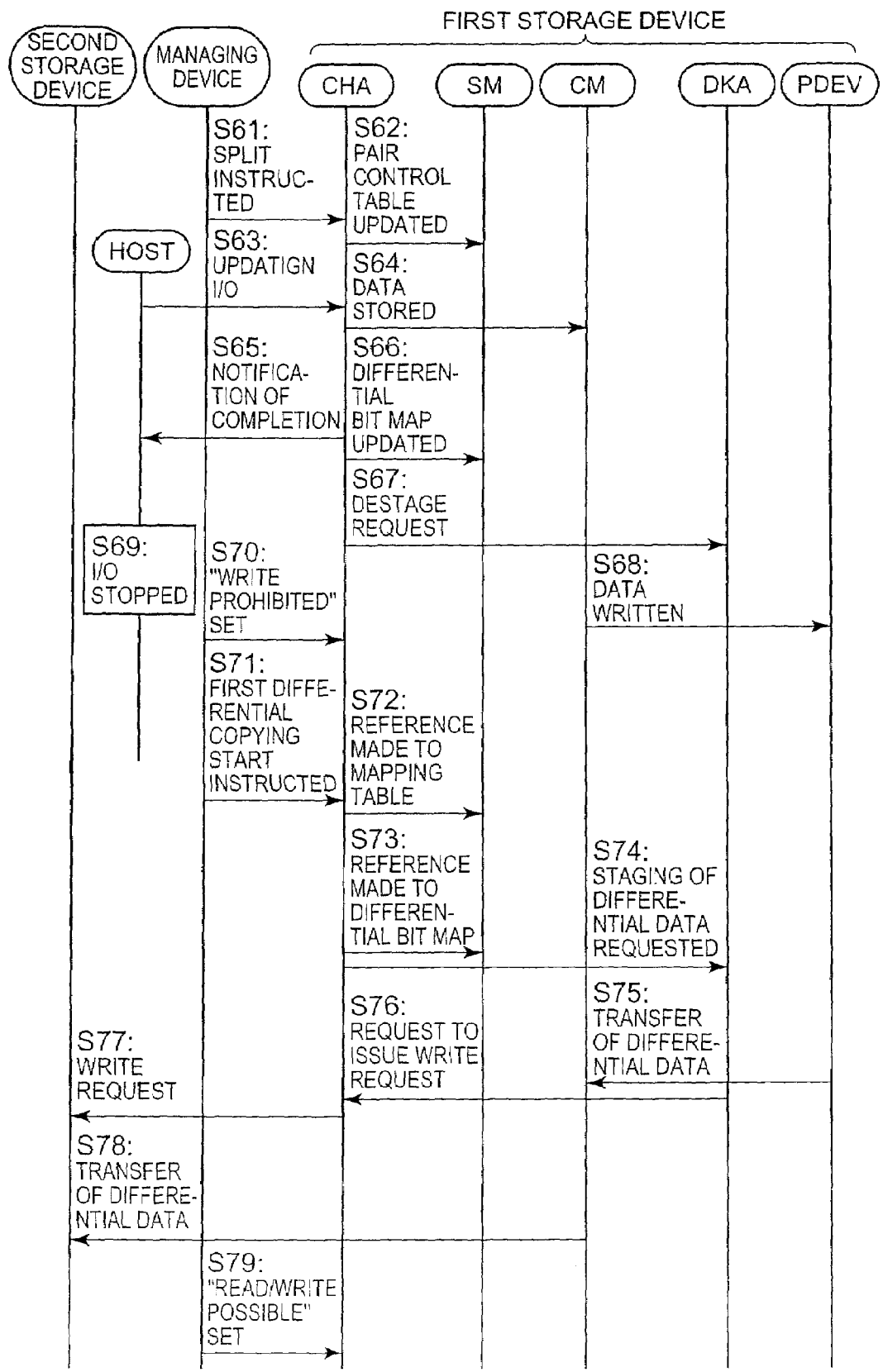
FIG. 15 is a sequence flow chart showing the flow of the first differential copying mode.
Figure 16:
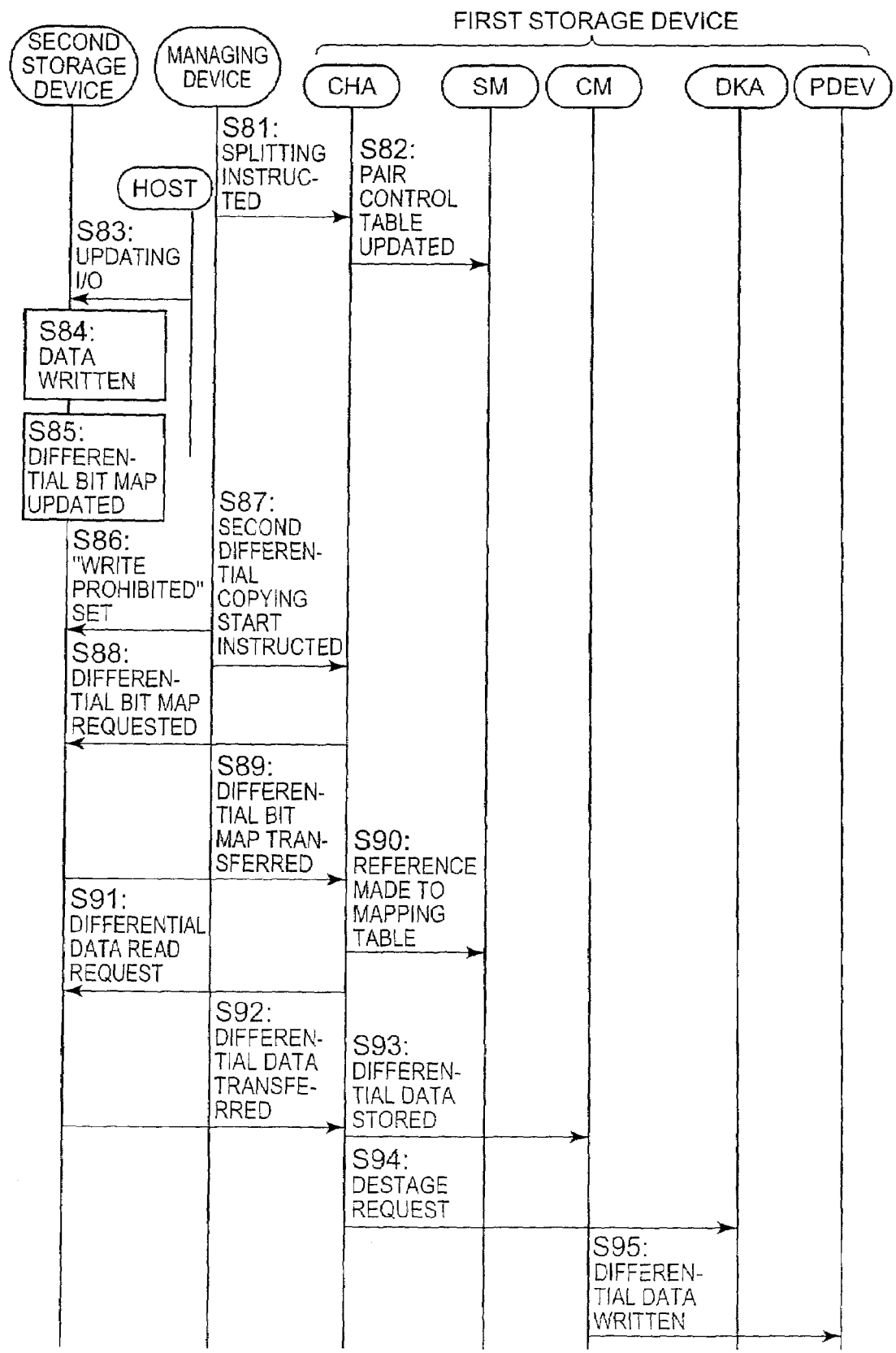
FIG. 16 is a sequence flow chart showing the flow of the second differential copying mode.

Next, the method used to synchronize the storage contents between the internal volume 190 and virtual internal volume 191 (whose substance is the external volume 260) will be described. FIGS. 13 and 14 show the full copying mode in which all of the storage contents of the copying source volume are copied into the copying destination volume, and FIGS. 15 and 16 show the differential copying mode in which only the differential data generated in the copying source volume following the completion of full copying is coped into the copying destination volume. In the case of both copying modes, data is transferred directly between the first storage device and second storage device; the host 10 does not participate.

The managing device 20 instructs the first storage device 100 to execute the first full copying mode (S41). The CHA 110 that receives this instruction refers to the mapping table T1 stored in the shared memory 140 (S42), and acquires path information for the external volume 260 which is the copying destination volume. The CHA 110 issues a read command to the second storage device 200 (S43), and requests the read-out of the data that is stored in the external volume 260.

In response to the read command from the first storage device 100, the second storage device 200 reads out data from the external volume 260 (S44), and transmits this read-out data to the first storage device 100 (S45).

When the CHA 110 receives the data from the second storage device 200, the CHA 110 stores this received data in the cache memory 130 (S46). Furthermore, for example, the CHA 110 requests the execution of destage processing from the DKA 120 by writing a write command into shared memory 140 (S47).

The DKA 120 occasionally refers to the shared memory 140, and when the DKA 120 discovers an unprocessed write command, the DKA 120 reads out the data stored in the cache memory 130, performs processing such as address conversion and the like, and writes this data into a specified disk drive 161 (S48).

Thus, all of the storage contents of the external volume 260 which is the copying source volume can be copied into the internal volume 190 which is the copying destination volume, so that the storage contents of both volumes are caused to coincide.

FIG. 14 shows the processing of the second full copying mode. The first storage device 100 instructs the first storage device 100 to execute the second full copying mode (S51). The CHA 110 that receives this instruction refers to the mapping table T1 stored in the shared memory 140 (S52), and acquires path information for the external volume 260 which is the copying destination volume. Furthermore, the CHA 110 requests that the DKA 120 perform staging (processing that transfers the data to a cache) of the data stored in the internal volume 190 (S53).

In response to this staging request, the DKA 120 reads out the data of the internal volume 190 from the disk drive 161, and stores this data in the cache memory 130 (S54). Furthermore, the DKA 120 request that the CHA 110 issue a write command (S55).

On the basis of the path information acquired in S52, the CHA 110 issues a write command to the second storage device 200 (S56). Next, the CHA 110 transmits write data to the second storage device 200 (S57).

The second storage device 200 receives the write data from the first storage device 100 (S58), and stores this data in a specified disk drive 220 (S59). Thus, the storage contents of the internal volume 190 which is the copying source volume can be copied into the external volume 260 which is the copying destination volume, so that the storage contents of both volumes can be caused to coincide.

FIG. 15 shows the processing of the first differential copying mode. First, prior to the initiation of differential copying, the managing device 20 requests the first storage device 100 to split the copying pair (S61). The CHA 110 that receives the splitting instruction updates the copying pair control table T6 stored in the shared memory 140, and alters the status of the copying pair to a split state (S62). As a result, the pair state of the internal volume 190 and virtual internal volume 191 (external volume 260) is dissolved.

The host 10A executes updating I/O for the internal volume 190 (S63). The CHA 110 stores the write data received from the host 10A in the cache memory 130 (S64), and sends a response to the host 10A indicating that processing of the write command has been completed (S65).

Furthermore, the CHA 110 respectively updates the differential bit map T4 and the differential data 192 (S66), and requests that the DKA 120 execute destage processing (S67). The DKA 120 stores the write data generated by the updating I/O in the disk drive 161 (S68).

Prior to the initiation of differential copying, the updating I/O from the host 10A is stopped (S69). For example, this stopping of the I/O can be accomplished manually by the user. Furthermore, the managing device 20 alters the access attribute of the internal volume 190 from "read/write possible" to "write prohibited" (S70). Although the issuing of updating I/O by the host 10A is already stopped, further variation of the storage contents of the internal volume 190 can be prevented in advance by altering the access attribute to "write prohibited".

Then, the managing device 20 instructs the first storage device 100 to execute first differential copying (S71). The CHA 110 that receives this instruction refers to the mapping table T1 (S72), and acquires path information for the external volume 260. Furthermore, the CHA 110 refers to the differential bit map T4 (S73), and requests that the DKA 120 perform destaging of the differential data 192 (S74).

The DKA 120 reads out the differential data 192 produced for the internal volume 190 from the disk drive 161, and stores this data in the cache memory 130 (S75). Then, the DKA 120 requests that the CHA 110 issue a write command (S76).

The CHA 110 issues a write command to the second storage device 200 (S77), and transmits write data (the differential data 192) to the second storage device 200 (S78). The second storage device 200 stores the received write data in the external volume 260. As a result, the storage contents of the external volume 260 and internal volume 190 coincide. Then, the managing device 20 alters the access attribute of the internal volume 190 from "write prohibited" to "read/write possible" (S79).

FIG. 16 shows the processing of the second differential copying mode. Prior to the initiation of differential copying, the managing device 20 first instructs the first storage device 100 to split the copying pair (S81). The CHA 110 that receives this instruction updates the copying pair control table T6, and dissolves the pair state (S82).

Then, when the host 10B accesses the external volume 260 and issues updating I/O (S83), the second storage device 200 writes the write data into the disk drive 220 (S84), and respectively updates the differential data 261 and differential bit map T4 (2) (S85).

When differential copying is initiated, the managing device 20 alters the access attribute of the external volume 260 from "read/write possible" to "write prohibited" (S86), thus prohibiting updating of the external volume 260; then, the managing device 20 instructs the first storage device 100 to initiate second differential copying (S87).

The CHA 110 that receives the instruction to initiate differential copying requests that the second storage device 200 to transfer the differential bit map T4 (2) (S88). Since the contacts of the differential data 261 generated in the external volume 260 are controlled by the second storage device 200, the first storage device 100 acquires the differential bit map T4 (2) from the second storage device 200 (S89).

Furthermore, in this embodiment, a construction is used in which commands and data are directly exchanged between the first storage device 100 and second storage device 200. However, the present invention is not limited to this; for example, it would also be possible to exchange data such as the differential bit map and the like between the respective storage devices 100 and 200 via the managing device 20.

The CHA 110 refers to the mapping table T1 (S90), and acquires path information indicating the path to the external volume 260. Then, the CHA 110 requests the transfer of the differential data 261 by issuing a read command to the second storage device 200 (S91).

In response to the read command from the first storage device 100, the second storage device 200 transmits the differential data 261 to the first storage device 100 (S92). Then, the CHA 110 that receives this differential data 261 stores the differential data 261 in the cache memory 130 (S93) The CHA 110 requests that the DKA 120 perform destage processing of the differential data 261 (S94). Then, the DKA 120 reads out the differential data 261 stored in the cache memory 130, and writes the data constituting the internal volume 190 into the disk drive 161 (S95). As a result, the storage contents of the external volume 260 and internal volume 190 coincide.

In the present embodiment, as was described in detail above, the external volume 260 can be handled as though this volume were a logical volume inside the first storage device 100 by mapping the external disk drive 220 into the V-VOL. Accordingly, even in cases where the second storage device 200 is an old type device that cannot be directly connected to the host 10, the memory resources of the old type device can be reutilized as memory resources of the first storage device 100, and can be provided to the host 10, by interposing a new type first storage device 100. As a result, the old type storage device 200 can be connected to a new type storage device 100, and the memory resources can be effectively utilized.

Furthermore, in cases where the first storage device 100 is a high-performance, highly functional new type device, the low performance of the second storage device can be hidden by the high-performance computer resources (cache capacity, CPU processing speed and the like) of the first storage device 100, so that high-performance services can be provided to the host 10 using a virtual internal volume that utilizes the disk drive 220. Furthermore, functions such as (for example) striping, expansion, splitting, RAID and the like can be added to an external volume 260 constructed in the disk drive 220, and can be used. Accordingly, compared to cases in which an external volume is directly mapped into an LUN, the degree of freedom of utilization is increased so that convenience of use is improved.

In the present embodiment, in addition to these effects, the storage contents can be synchronized between the internal volume 190 and virtual internal volume 191 (external volume 260). Accordingly, a backup of the internal volume 190 can be formed in the virtual internal volume 191, or conversely, a backup of the virtual internal volume 191 can be formed in the internal volume 190, so that the convenience is even further improved.

Furthermore, in the present embodiment, since both a full copying mode and a differential copying mode can be performed, efficient copying can be performed in accordance with the conditions.

Furthermore, in the present embodiment, a construction is used in which the storage contents of the copying source volume are fixed by altering the access attribute to "write prohibited". Accordingly, volume copying can be executed without particularly altering the processing contents in the host 10.

2. Second Embodiment

Figure 17:
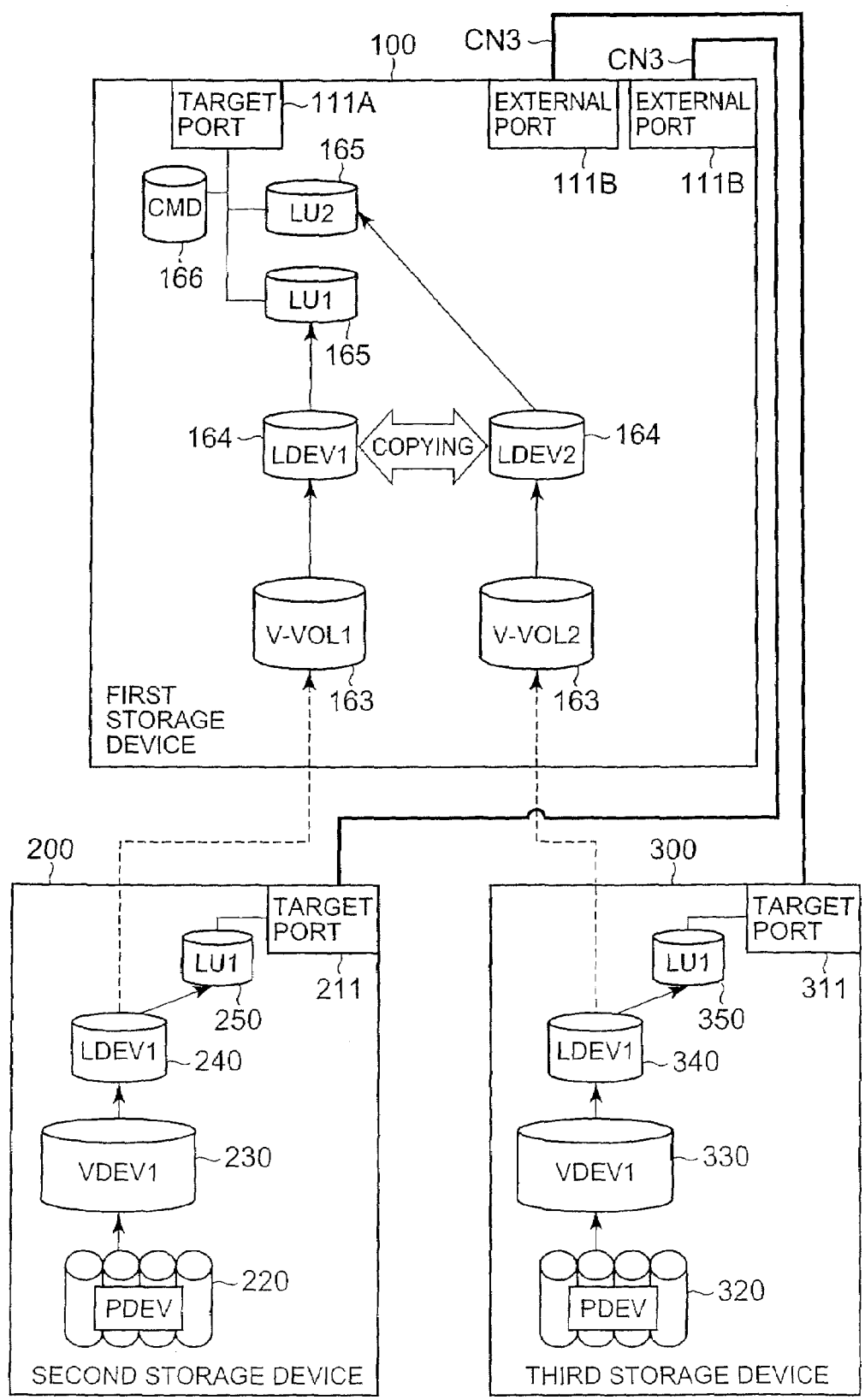
FIG. 17 is an explanatory diagram showing the storage structure of a storage system according to a second embodiment.

A second embodiment of the present invention will be described with reference to FIG. 17. The following embodiments including this embodiment correspond to modifications of the abovementioned first embodiment. In the present embodiment, copying is performed among a plurality of virtual internal volumes inside the first storage device 100. Furthermore, in the present embodiment, the first storage device 100 does not comprise any internal volumes. FIG. 17 is an explanatory diagram showing the storage structure of a storage system constituting a second embodiment of the present invention.

In the present embodiment, the first storage device 100 comprises a third storage device 300 in addition to a second storage device 200. Like the second storage device 200, this third storage device 300 is a device that is externally connected to the first storage device 100. Like the second storage device 200, the third storage device 300 comprises (for example) PDEVs 320, VDEVs 330, LDEVs 349, LUs 350, targets 311 and the like. In regard to the construction of the third storage device 300, the construction of the second storage device 200 can be employed; since this construction is not the gist of the present invention, details will be omitted. However, the second storage device 200 and third storage device 300 need not have the same structure.

The first storage device 100 does not comprise PDEVs 161 which are physical storage devices, and does not comprise real volumes (internal volumes). The first storage device 100 operates as a virtualization storage device and comprises only "LDEV 1" and "LDEV 2", which are virtual internal volumes. Accordingly, the first storage device 100 need not be a disk array device; for example, this first storage device 100 may be an intelligent type switch comprises a computer system.

The first virtual internal volume "LDEV 1" 164 is connected to "LDEV 1" 240, which is a real volume of the second storage device 200, via "V-VOL" 163. The second virtual internal volume "LDEV 2" 164 is connected to "LDEV 1" 340, which is a real volume of the third storage device 300, via "V-VOL 2" 163.

Furthermore, in the present embodiment, the system is devised so that full copying and differential copying are performed between the first virtual internal volume "LDEV 1" and the second virtual internal volume "LDEV 2" inside the first storage device 100.

3. Third Embodiment

Figure 18:
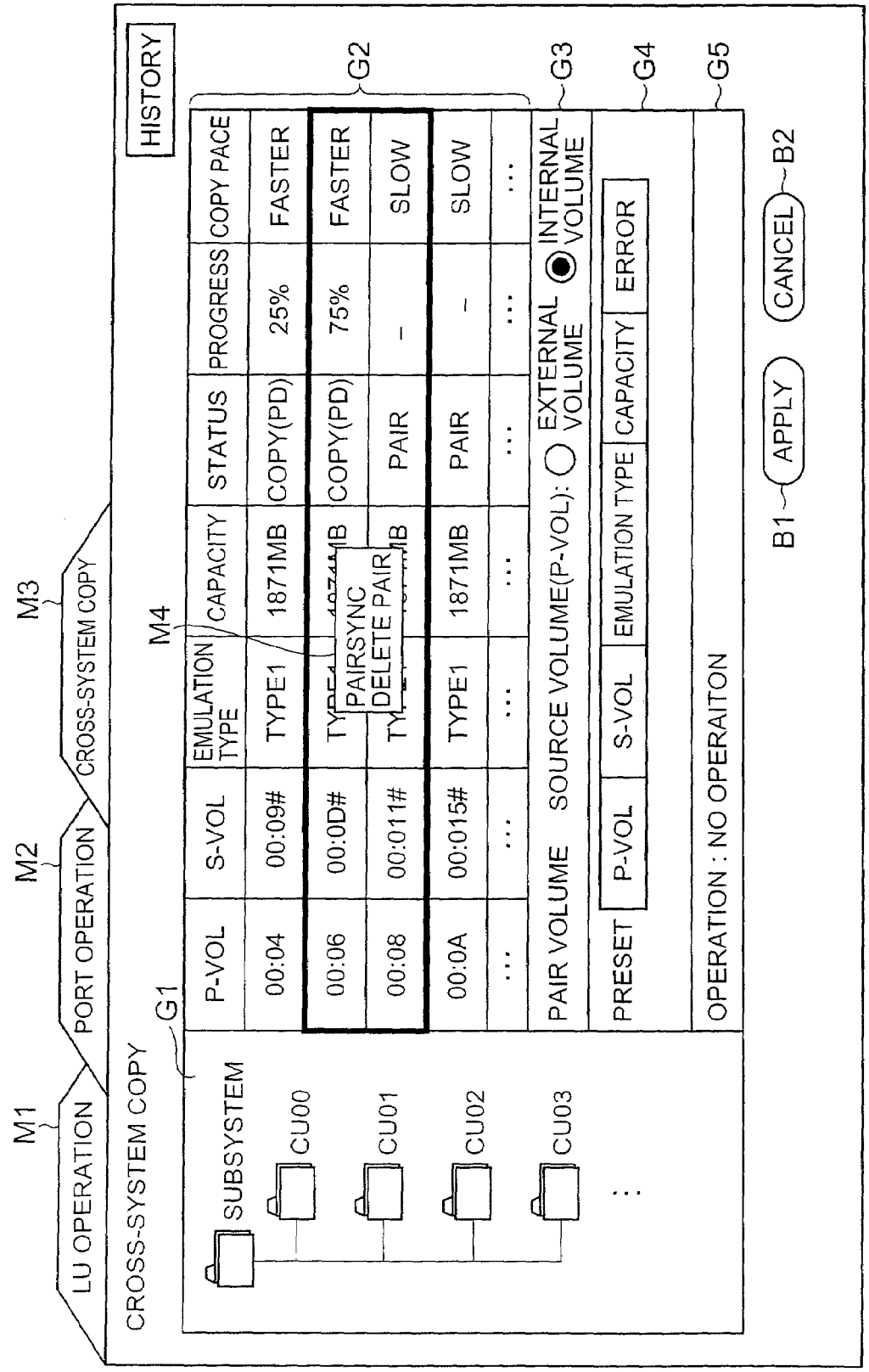
FIG. 18 is an explanatory diagram showing the storage structure of a storage system according to a third embodiment.

A third embodiment will be described with reference to FIG. 18. FIG. 18 is an explanatory diagram which shows one example of the control screen used by the storage system. This embodiment can be used in any of the respective embodiments described above.

For example, in cases where copying pairs are set in the storage system, the user logs into the managing device 20, and calls up a control screen such as that shown in FIG. 18. When the construction of a copying pair or the like is set on this control screen, the managing device 20 sends instructions for alteration of the construction to one or both of the storage devices 100 and 200. Receiving these instructions, the respective storage devices 100 and 200 alter their internal construction.

A plurality of different types of control menus M1 through M3 can be set on the control screen. For example, these control menus M1 through M3 can be constructed as tab type switching menus. For instance, the menu M1 is a menu that is used to perform various types of LU operations such as production of volumes or the like. The menu M2 is a menu that is used to perform communications port operations. The menu M3 is a menu that is used to perform volume copying operations between the storage devices described in the abovementioned embodiments.

For example, the menu M3 can be constructed so that this menu includes a plurality of screen regions G1 through G5. The screen region G1 is used to select the storage device (subsystem) that performs the setting of copying pairs. The conditions of the set copying pairs are displayed in the screen region G2. For instance, the copying source volume (P-VOL), copying destination volume (S-VOL), emulation type, capacity, copying status, progression, copying speed and the like can be displayed in the screen region G2.

For instance, using a pointing device such as a mouse or the like, the user can select two copying pairs displayed in the screen region G2; furthermore, the user can display the submenu M4 by right clicking [with the mouse]. The user can designate the synchronization of volumes or dissolution of pairs by means of the submenu M4.

In the screen region G3, either internal volumes inside the first storage device 100 or external volumes inside the second storage device 200 can be exclusively selected as the volumes of the copying pair. In the figures, a case is shown in which an internal volume is selected as the copying source volume. An internal volume or external volume can be designated as either the copying source volume or copying destination volume.

Preset values can be displayed in the screen region G4. Operation states can be displayed in the screen region G5. When the setting of the copying pair has been completed, the user can cause alterations in the construction to be reflected by operating an application button B1. In cases where the content of this setting is to be canceled, the user operates a cancel button B2. The abovementioned screen construction is an example; the present invention is not limited to this construction.

Furthermore, the present invention is not limited to the respective embodiments described above. A person skilled in the art can make various additions, alterations and the like within the scope of the present invention.

What is claimed is:

1. A virtualization system including a virtualization storage device and a plurality of storage devices, the virtualization system comprising:
    at least one first port coupled to at least one host system;
    at least one second port coupled to a plurality of storage devices; and
    at least one controller forming a first virtual volume and a second virtual volume within the virtualization storage device; and
    each of the plurality of storage devices comprising:
        a plurality of disk drives; and
        a controller coupled to at least one second host system and forming at least one logical volume related to at least a portion of the plurality of disk drives;
    wherein the virtualization storage device controls to perform processes of splitting a relationship between the first virtual volume and the second virtual volume;
        receiving a first write request, the first write request being sent from the first host system for writing data to the first virtual volume;
        storing first differential information identifying data of the first write request, the data of the first write request being written after the splitting step; and
        transferring the data of the first write request to a first logical volume of a first storage device of the storage devices, the first logical volume being related to the first virtual volume, so that the first storage device can write the data of the first write request to a storage area of the disk drives related to the first logical volume;
    wherein a second storage device of the plurality of storage devices controls to perform processes of:
        receiving a second write request, the second write request being sent from the second host system for writing data to a second logical volume, which is related to the second virtual volume in the virtualization storage device and is formed in the second storage device; and
        storing second differential information identifying data of the second write request, the data of the second write request being written after the splitting step;
    wherein the virtualization storage device controls to perform processes of:
        receiving a differential copying request;
        if the differential copying request indicates to copy differential data from the first virtual volume to the second virtual volume, (1) controlling to copy the data of the first write request to the second virtual volume based on the first differential information, and (2) transferring the data of the first write request to the second logical volume of the second storage device of the storage devices, so that the second storage device can write the data of the first write request to a storage area of the disk drives related to the second logical volume; and if the differential copying request indicates to copy differential data from the second virtual volume to the first virtual volume, (3) requesting the second differential information from the second storage device, and (4) acquiring the second differential information from the second storage device, and (5) controlling to copy the data of the second write request to the first virtual volume based on the second differential information, and (6) transferring the data of the second write request to the first logical volume of the first storage device, so that the first storage device can write the data of the second write request to the storage area of the disk drives related to the first logical volume.

2. The virtualization system as recited in claim 1, wherein the virtualization storage device is an intelligent switch device; and
the relationship between the first virtual volume and the second virtual volume is a pair relationship.

3. The virtualization system as recited in claim 1, wherein the virtualization storage device is a switch device; and
the first differential information are location information identifying a location in the first virtual volumes in which the data of the first write request are written.

4. The virtualization system as recited in claim 1, wherein the first differential information are stored in a first management information storing area.

5. The virtualization system as recited in claim 1, wherein the second differential information are location information identifying a location of the data of the second write request.

6. The virtualization system as recited in claim 1 wherein the virtualization storage device is a switch device; and
the second differential information are stored in a second management information storing area.

7. The virtualization system as recited in claim 1, wherein the relationship between the first virtual volume and the second virtual volume is a pair relationship; and
the differential copying request is received from managing device.

8. The virtualization system as recited in claim 1, wherein for copying the data of the first write request to the second virtual volume, the virtualization storage device performs processes of
referring to the first differential information;
referring to a mapping information between the first virtual volume and the first logical volumes; and
reading the data of the first write request from the at least one of the first logical volumes of the first storage device.

9. The virtualization system as recited in claim 1, wherein the virtualization storage device is a switch device; and
for copying the data of the first write request to the second virtual volume, the virtualization storage device performs processes of:
referring to the first differential information;
referring to a mapping information between the first virtual volume and the first logical volumes; and
reading the data of the first write request from the at least one of the first logical volumes of the first storage device.

10. The virtualization system as recited in claim 1 wherein the virtualization storage device is a switch device;
the relationship between the first virtual volume and the second virtual volume is a pair relationship; and
for copying the data of the second write request to the first virtual volume, the virtualization storage device performs processes of:
referring to the second differential information;
referring to a mapping information between the second virtual volume and the second logical volumes; and
reading the data of the second write request from the at least one of the second logical volumes of the second storage device.

11. The virtualization system as recited in claim 1, wherein for copying the data of the second write request to the first virtual volume, the virtualization storage device performs processes of:
referring to the second differential information;
referring to a mapping information between the second virtual volume and the second logical volumes; and
reading the data of the second write request from the at least one of the second logical volumes of the second storage device based on both the referring to the second differential information and the referring to the mapping information.

12. A data copy method for a virtualization system including a virtualization storage device and a plurality of storage devices, where the virtualization storage device is coupled to at least one first host system and the plurality of storage devices and forming a first virtual volume and a second virtual volume within the virtualization storage device, each of the plurality of storage devices coupled to at least one second host system and forming at least one logical volume related to at least a portion of a plurality of disk drives, the data copy method comprising:
splitting, by the virtualization storage device, a relationship between the first virtual volume and the second virtual volume;
receiving, by the virtualization storage device, a first write request sent from the first host system for writing data to the first virtual volume;
storing, by the virtualization storage device, first differential information identifying data of the first write request, the data of the first write request being written after the splitting step;
transferring, by the virtualization storage device, the data of the first write request to a first logical volume of a first storage device of the storage devices, the first logical volume being related to the first virtual volume, so that the first storage device can write the data of the first write request to a storage area of the disk drives related to the first logical volume;
receiving, by a second storage device of the plurality of storage devices, a second write request, the second write request sent from the second host system for writing data to a second logical volume, which is related to the second virtual volume in the virtualization storage device and is formed in the second storage device; and
storing, by the second storage device, second differential information identifying data of the second write request, the data of the second write request being written after the splitting step;
receiving, by the virtualization storage device, a differential copying request;
if the differential copying request indicates to copy differential data from the first virtual volume to the second virtual volume, (1) controlling, by the virtualization storage device, to copy the data of the first write request to the second virtual volume based on the first differential information, and (2) transferring, by the virtualization storage device, the data of the first write request to the second logical volume of the second storage device of the storage devices, so that the second storage device can write the data of the first write request to a storage area of the disk drives related to the second logical volume; and if the differential copying request indicates to copy differential data from the second virtual volume to the first virtual volume, (3) requesting, by the virtualization storage device, the second differential information from the second storage device, and (4) acquiring, by the virtualization storage device, the second differential information from the second storage device, and (5) controlling, by the virtualization storage device, to copy the data of the second write request to the first virtual volume based on the second differential information, and (6) transferring, by the virtualization storage device, the data of the second write request to the first logical volume of the first storage device, so that the first storage device can write the data of the second write request to the storage area of the disk drives related to the first logical volume.

13. The data copy method as recited in claim 12, wherein the virtualization storage device is an intelligent switch device; and the relationship between the first virtual volume and the second virtual volume is a pair relationship.

14. The data copy method as recited in claim 12 wherein the virtualization storage device is a switch device; and the first differential information are location information identifying a location in the first virtual volumes in which the data of the first write request are written.

15. The data copy method as recited in claim 12, wherein the first differential information are stored in a first management information storing area.

* * * * *